(12) United States Patent
Barclay et al.

(10) Patent No.: US 11,765,244 B1
(45) Date of Patent: Sep. 19, 2023

(54) LATENCY-BASED SERVICE DISCOVERY AND ROUTING FOR MULTI-LOCATION SERVICE-ORIENTED APPLICATIONS

(71) Applicant: Amazon Technologies, Inc., Seattle, WA (US)

(72) Inventors: Christopher Barclay, Seattle, WA (US); Devlin Roarke Dunsmore, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 26 days.

(21) Appl. No.: 17/363,364

(22) Filed: Jun. 30, 2021

(51) Int. Cl.
*H04L 67/51* (2022.01)
*H04L 43/0852* (2022.01)
*H04L 61/4541* (2022.01)

(52) U.S. Cl.
CPC .......... *H04L 67/51* (2022.05); *H04L 43/0852* (2013.01); *H04L 61/4541* (2022.05)

(58) Field of Classification Search
CPC ..... H04L 67/51; H04L 67/1076; H04L 67/10; H04L 43/0852; H04L 61/4541; H04L 61/4511
See application file for complete search history.

(56) References Cited

U.S. PATENT DOCUMENTS

| | | | | |
|---|---|---|---|---|
| 9,747,635 B1 * | 8/2017 | Ward, Jr. | ............... | G06Q 30/08 |
| 10,182,129 B1 * | 1/2019 | Peterson | ................... | G06F 8/65 |
| 10,848,574 B2 * | 11/2020 | Battle | ..................... | H04L 43/16 |
| 11,201,794 B1 * | 12/2021 | Guo | ..................... | H04L 43/0864 |
| 11,212,171 B1 | 12/2021 | Ozkan et al. | | |
| 11,470,047 B1 * | 10/2022 | Shevade | ................. | H04L 67/10 |
| 11,489,814 B1 * | 11/2022 | Engskow | ............ | H04L 61/4511 |
| 2017/0180487 A1 * | 6/2017 | Frank | .................. | G06F 11/3688 |
| 2019/0103990 A1 * | 4/2019 | Cidon | ..................... | H04L 12/14 |
| 2021/0168203 A1 * | 6/2021 | Parulkar | ............. | H04L 67/1076 |

OTHER PUBLICATIONS

Notice of Allowance, U.S. Appl. No. 17/363,295, dated Apr. 20, 2022, 9 pages.

* cited by examiner

*Primary Examiner* — Jungwon Chang
(74) *Attorney, Agent, or Firm* — NICHOLSON DE VOS WEBSTER & ELLIOTT, LLP

(57) ABSTRACT

Techniques are described for a location-aware service-oriented application deployment management ("SOADM") service that abstracts the complexities of deploying distributed applications in a cloud provider network providing many possible deployment zones of one or multiple types. These deployment zone types can include traditional cloud provider regions and availability zones as well as so-called edge locations (e.g., cloud provider operated edge locations, customer-operated edge locations, third-party operated edge locations, communications service provider (CSP) associated edge locations). The SOADM service enables users to create service group configurations representing a service-oriented application, including its constituent services and dependent resources, and specify distribution strategies for deploying and/or redistributing application services and resources, among other configurations. Using such configurations, the SOADM service automatically deploys and scales simple or complex, single or multi-service applications for users across any number of deployment zones and deployment zone types.

20 Claims, 19 Drawing Sheets

```
create-service-group \
--service-group-name 'example_service_group ' \
[--vpn-cidrs]
[--client-token]
```

1000

```
{
    serviceGroup : {
        serviceGroupName : 'example_service_group',
        vpnCidrs : [ '172.26.0.0/16' ],
        dnsBaseName : [ example_service_group-abc123.app ],
    }
}
```

```
create-service-configuration \
--service-configuration-name 'example_service' \
--service-group-name 'example_service_group ' \
--distribution-strategy-name 'example_distribution_strategy' \
--service-template "{
      serviceConfigurations: [ {
            count: 2,
            taskDefinitionConfiguration: {
                  cpu: 4,
                  memory: 16,
                  containerDefinitions: [ {
                        command: [' sh' , '-c'],
                        image: '01234.abc.def.example.com/example:1
                        name: 'example_service',
                        portMappings: [ {
                              containerPort: 80
                        } ]
                  }
            }
      } ],
      loadBalancerConfiguration: {
            protocol: 'HTTPS ' ,
            containerPorts: [{
                  containerName: 'example_service',
                  containerPort: 80
            }]
      }
}"
[--service-name \]
[--depends-on "[ {
      dependencyType: 'SYSTEM_RESOURCE' ,
      dependencyName: 'example_service_resource'
}]" \]
[--client-token]
```

FIG. 11

```
create-service-resource-configuration \
--service-resource-configuration-name 'example_service_resource' \
--service-group-name 'example_service_group ' \
--resource-type 'database::Table' \
[--resource-template file://db_global_table_cfn.template \]
[--source-resource-identifier \]
[--service-resource-name\]
[--client-token]
```

1200

1210 / 1220 / 1230

```
create-distribution-strategy \
--distribution-strategy-name 'example_distribution_strategy' \
--service-group-name 'example_service_group ' \
--zone-types [
        'AVAILABILITY_ZONE',
        'LOCAL_ZONE',
        'WAVELENGTH_ZONE'
] \
[--max-locations 20 \]
[--distribution-group-configuration "{
        managedWeighting: false,
        distributionGroups: [
                {
                        distributionGroupName: 'us-east',
                        weight: 5
                }, {
                        distributionGroupName: 'us-west-2',
                        weight: 3
                }, {
                        distributionGroupName: 'eu-west',
                        weight: 3
                }, {
                        distributionGroupName: 'eu-central-1',
                        weight: 1
                }
        ]
}" \]
[--global-min-size 250 \]
[--global-max-size 500 \]
[--client-token]
```

```
// centralized services
create-distribution-strategy \
--distribution-strategy-name 'centralized_service_strategy' \
--service-group-name 'example_gaming_service' \
--zone-types ['AVAILABILITY_ZONE'] \
--region-configuration "{
    strictTargeting: true,
    regions: [
        { regionName: 'us-east-1' },
        { regionName: 'eu-west-1' }
    ]
}"
```

1300

```
// edge services
$ create-distribution-strategy \
--distribution-strategy-name 'edge_service_strategy' \
--service-group-name 'example_gaming_service' \
--zone-types ['AVAILABILITY_ZONE', 'LOCAL_ZONE', 'WAVELENGTH_ZONE'] \
[--max-locations 50 \]
[--region-configuration "{
    regions: [
        { regionName: 'us-east-1' },
        { regionName: 'us-east-2' },
        { regionName: 'us-west-1' },
        { regionName: 'us-west-2' },
        { regionName: 'eu-west-1' },
        { regionName: 'eu-west-2' },
        { regionName: 'eu-west-3' },
        { regionName: 'eu-central-1'}
    ]
}
```

```
create-global-deployment-configuration \
--global-deployment-configuration-name 'edge_global_deployment_config' \
--service-group-name 'example_service_group ' \
[--global-deployment-strategy-name 'SINGLE_LOCATION_ALL_LOCATIONS' \]
[--min-healthy-locations-percent 66 \]
[--no-min-healthy-locations-percent\]
[--auto-rollback-configuration "{
     enabled: true
}" \]
[--client-token]
```

1400

```
run-service \
--service-configuration-name 'example_service' \
[--service-configuration-version '1' \]
[--service-deployment-configuration-name ' example_deployment_config' \]
[--service-deployment-configuration-version ' 1' \]
[--distribution-strategy-name 'example_distribution_strategy' \]
[--distribution-strategy-version '1' \]
[--client-token]
```

OPERATIONS
1600

```
RECEIVING, AT A CLOUD PROVIDER NETWORK, A REQUEST FROM
A FIRST SERVICE OF A SERVICE-ORIENTED SOFTWARE
APPLICATION THAT INCLUDES A PLURALITY OF SERVICES,
WHEREIN THE REQUEST IDENTIFIES A SECOND SERVICE OR A
COMPUTING RESOURCE OF THE SERVICE-ORIENTED SOFTWARE
APPLICATION, WHEREIN THE CLOUD PROVIDER NETWORK
INCLUDES A PLURALITY OF DEPLOYMENT ZONES, WHEREIN THE
FIRST SERVICE IS DEPLOYED IN A FIRST DEPLOYMENT ZONE OF
THE PLURALITY OF DEPLOYMENT ZONES, AND WHEREIN EACH OF
A PLURALITY OF SECOND DEPLOYMENT ZONES INCLUDES AN
INSTANCE OF THE SECOND SERVICE OR AN INSTANCE OF THE
COMPUTING RESOURCE 1602
```

```
IDENTIFYING, BASED ON DATA INDICATING NETWORK LATENCY
ESTIMATES BETWEEN DEPLOYMENT ZONES OF THE PLURALITY OF
DEPLOYMENT ZONES, AN INSTANCE OF THE SECOND SERVICE OR
AN INSTANCE OF THE COMPUTING RESOURCE ASSOCIATED WITH
A LOWEST NETWORK LATENCY ESTIMATE RELATIVE TO THE FIRST
SERVICE 1604
```

```
ROUTING THE REQUEST FROM THE FIRST SERVICE TO THE
INSTANCE OF THE SECOND SERVICE OR TO THE INSTANCE OF THE
COMPUTING RESOURCE ASSOCIATED WITH THE LOWEST
NETWORK LATENCY RELATIVE TO THE FIRST SERVICE, WHEREIN
THE REQUEST IS ROUTED WITHOUT TRAVERSING THE PUBLIC
INTERNET 1606
```

*FIG. 16*

LATENCY-BASED SERVICE DISCOVERY AND ROUTING FOR MULTI-LOCATION SERVICE-ORIENTED APPLICATIONS

BACKGROUND

Cloud computing platforms often provide on-demand, managed computing resources to users. Such computing resources (e.g., compute and storage capacity) are often provisioned from large pools of capacity installed in data centers of a cloud computing provider. Users can request computing resources from the "cloud," and the cloud can provision compute resources to those users. Technologies such as virtual machines and containers are often used to allow users to securely share capacity of computer systems.

BRIEF DESCRIPTION OF DRAWINGS

Various embodiments in accordance with the present disclosure will be described with reference to the drawings, in which:

FIG. 10 is a diagram illustrating an exemplary create service group request and response according to some embodiments.

FIG. 11 is a diagram illustrating an exemplary create service configuration request according to some embodiments.

FIG. 12 is a diagram illustrating an exemplary create service resource configuration request and an exemplary create distribution strategy request according to some embodiments.

FIG. 13 is a diagram illustrating examples for configuring a distribution strategy for a centralized service and also for an edge service according to some embodiments.

FIG. 14 is a diagram illustrating an exemplary create global deployment configuration request and an exemplary run service request according to some embodiments.

FIG. 16 is a flow diagram illustrating operations of a method for providing service discovery and latency-based routing for a multi-service application deployed across any number of separate deployment zones according to some embodiments.

DETAILED DESCRIPTION

The present disclosure relates to methods, apparatus, systems, and non-transitory computer-readable storage media for a location-aware service-oriented application deployment management ("SOADM") service that abstracts the complexities of deploying distributed applications in a cloud provider network providing many possible deployment zones of one or multiple types. These deployment zones generally correspond to physical locations where the cloud provider network provides data centers or other compute capacity and can include deployment zones of various types, e.g., traditional cloud provider regions and availability zones as well as so-called edge locations (e.g., cloud provider operated edge locations, customer-operated edge locations, third-party operated edge locations, communications service provider (CSP) associated edge locations). According to embodiments described herein, the SOADM service enables users to create service group configurations representing a service-oriented application, including its constituent services and dependent resources, to specify distribution strategies for deploying and/or redistributing application services and resources, among other configurations. Using such configurations, the SOADM service can automatically deploy and scale simple or complex, single or multi-service applications for users across any number of deployment zones and deployment zone types according to the user configuration.

Applications that deliver personalized and immersive experiences to end users are challenging for architectures that use centralized processing in a single location because latencies to end users can impact the desired user experience. For example, an application deployed in one geographic location may provide responsive service to users located geographically nearby; however, end users located in distant geographic locations may experience poor service due to the substantial communications latency resulting from this distance. Moreover, this problem changes over time as geographic access patterns change throughout the course of a day. For example, an application may be heavily used in North America during the daytime while there is little concurrent usage from Asia at that point. However, this usage may flip at a different point in time when it is daytime in Asia and evening in North America. Thus, application developers require ubiquitous compute that is close to their end users, despite their locations potentially changing over time. However, such distributed environments substantially increase the complexity of application development and operations, even in modern cloud networks.

Figure 1:
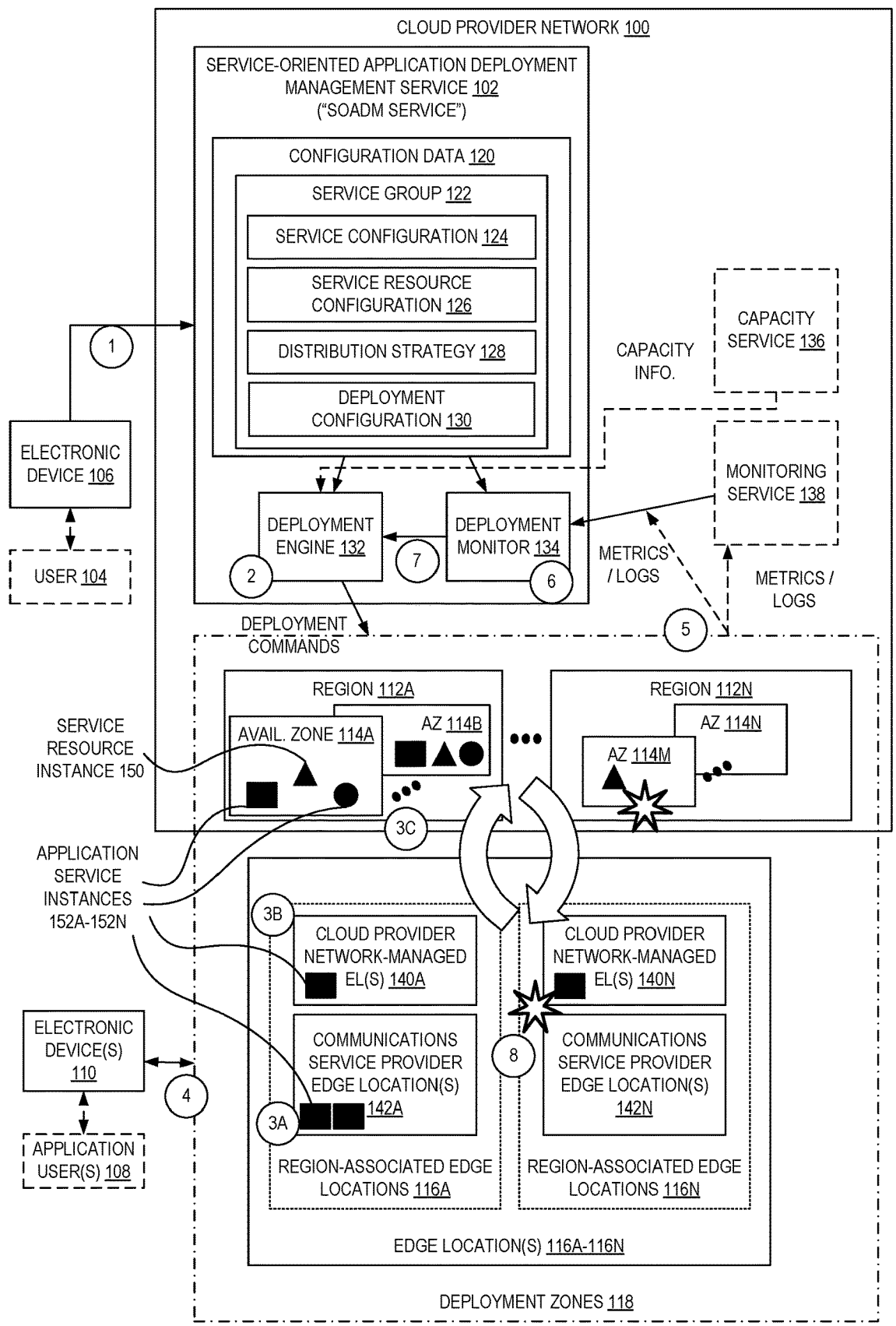
FIG. 1 illustrates a service-oriented application deployment management ("SOADM") service providing user-configurable multi-service application deployment and distribution across multiple types and locations of deployment zones according to some embodiments.

As indicated herein, in some embodiments a SOADM service allows users to configure an application, which typically includes one or multiple services and dependent resources, with deployment and/or distribution strategies indicating how and where the application developer wants the application to be deployed. With this user configuration data, the SOADM can manage the deployment and redistribution of various components of the application on behalf of the user without requiring any (or substantial) user involvement. For example, FIG. 1 illustrates a SOADM service providing user-configurable multi-service application deployment and distribution across multiple types and locations of deployment zones according to some embodiments. In FIG. 1, the SOADM service 102 is implemented within a cloud provider network 100, and in some embodiments is implemented as software executed by one or more computing devices at one or more geographic locations.

A cloud provider network, or "cloud," refers to a large pool of network-accessible computing resources (such as compute, storage, and networking resources, applications, and services). The cloud can provide convenient, on-demand network access to a shared pool of configurable computing resources that can be programmatically provisioned and released in response to user commands. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions (e.g., regions 112A-112N), where a region is a geographical area in which the cloud provider clusters data centers. Each region includes multiple (e.g., two or more) availability zones (AZs) 114 connected to one another via a private high-speed network, for example a fiber communication connection. An AZ (also known as an availability domain) is thus one type of "deployment zone" that provides an isolated failure domain including one or more data center facilities with separate power, separate networking, and separate cooling from those in another AZ—for example AZ 114A provides an isolated fault domain from AZ 114B, while both AZs 114A-114B are part of a same region 112A. Similarly, AZs 114M-114N provide isolated fault domains within a different region 112N. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a virtual private network (VPN) tunnel or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

A cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host can have an IP address in the substrate network. Hardware virtualization technology can enable multiple operating systems to run concurrently on a host computer, for example as VMs on the host. A hypervisor, or virtual machine monitor (VMM), on a host allocates the host's hardware resources amongst various VMs on the host and monitors the execution of the VMs. Each VM can be provided one or more IP addresses in the overlay network, and the VMM on a host can be aware of the IP addresses of the virtual machines on the host. The VMMs (and/or other devices or processes on the network substrate) can use encapsulation protocol technology to encapsulate and route network packets (e.g., client IP packets) over the network substrate between virtualized resources on different hosts within the cloud provider network. The encapsulation protocol technology can be used on the network substrate to route encapsulated packets between endpoints on the network substrate via overlay network paths or routes. The encapsulation protocol technology can be viewed as providing a virtual network topology overlaid on the network substrate. The encapsulation protocol technology can include the mapping service that maintains a mapping directory that maps IP overlay addresses (e.g., public IP addresses) to substrate IP addresses (e.g., private IP addresses), which can be accessed by various processes on the cloud provider network for routing packets between endpoints.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

In some embodiments, segments of a cloud provider network—referred to herein as edge locations ("EL", or alternatively "provider substrate extensions" or "edge zones")—can be provisioned within a network or facility that is separate from the cloud provider network. For example, a cloud provider network typically includes a physical network (e.g., sheet metal boxes, cables, rack hardware) referred to as the substrate. The substrate can be considered as a network fabric containing the physical hardware that runs the services of the provider network. In some implementations, a provider substrate "extension" (or edge zone) forms an edge location that acts as an extension of the cloud provider network substrate formed by one or more servers located on-premise in a user or partner facility, in a separate cloud provider-managed facility, in a communications service provider facility, or in another type of facility including servers where such server(s) can communicate over a network (e.g., a publicly-accessible network such as the Internet) or direct network connection with a nearby AZ or region of the cloud provider network. Users can access an edge location via the cloud provider substrate or other networks and can use the same or similar application programming interfaces (APIs)—provided by the cloud provider network itself—to create and manage resources in edge locations as they would use to create and manage resources in a region of a cloud provider network.

As indicated above, one example type of edge location is one that is formed by servers located on-premises in a user or partner facility. This type of edge location located outside of cloud provider network data centers can be referred to as an "outpost" of the cloud provider network. Another example type of edge location is one that is formed by servers located in a separate facility managed (or operated, owned, leased, etc.) by the cloud provider but that includes data plane capacity controlled at least partly by a separate control plane within the cloud provider network (e.g., in an AZ or region of the cloud provider network).

In some embodiments, yet another example of an edge location is one deployed within a facility of a communications service provider network. Communications service providers generally include companies that have deployed networks through which end users obtain network connectivity. For example, communications service providers can include mobile or cellular network providers (e.g., operating 3G, 4G, 5G networks or the like), wired internet service providers (e.g., cable, digital subscriber lines (DSL), fiber-optic, etc.), or WiFi providers (e.g., at locations such as hotels, coffee shops, airports, stadiums, arenas, cities, etc.). While traditional deployments of computing resources in data centers provide various benefits due to centralization, physical constraints such as the network distance and number of network hops between end user devices and those computing resources can prevent very low latencies from being achieved. By installing or deploying capacity in the form of edge locations, the cloud provider network operator can provide computing resources with dramatically lower access latency to end user devices—in some cases to single-digit millisecond latency. Such low latency access to compute resources can be an important enabler to provide improved responsivity for existing cloud-based applications and to enable the next generation of applications for game streaming, virtual reality, real-time rendering, industrial automation, autonomous vehicles, or the like.

Thus, as used herein, the computing resources of the cloud provider network installed outside of the regions of the cloud provider network are known as cloud provider network edge locations, or simply edge locations, in that they are closer to the "edge" where end users connect to some network compared to other computing resources deployed in a more centralized data center (e.g., within a facility of the cloud provider implementing part of a region of that cloud network). Such edge locations include one or more networked computer systems that provide users of the cloud provider network with computing resources to serve end users with lower latency than would otherwise be achievable if those compute instances were hosted in a more traditional data center site. An edge location deployed in a wireless communication service provider network can also be referred to as a "wavelength zone."

Figure 2:
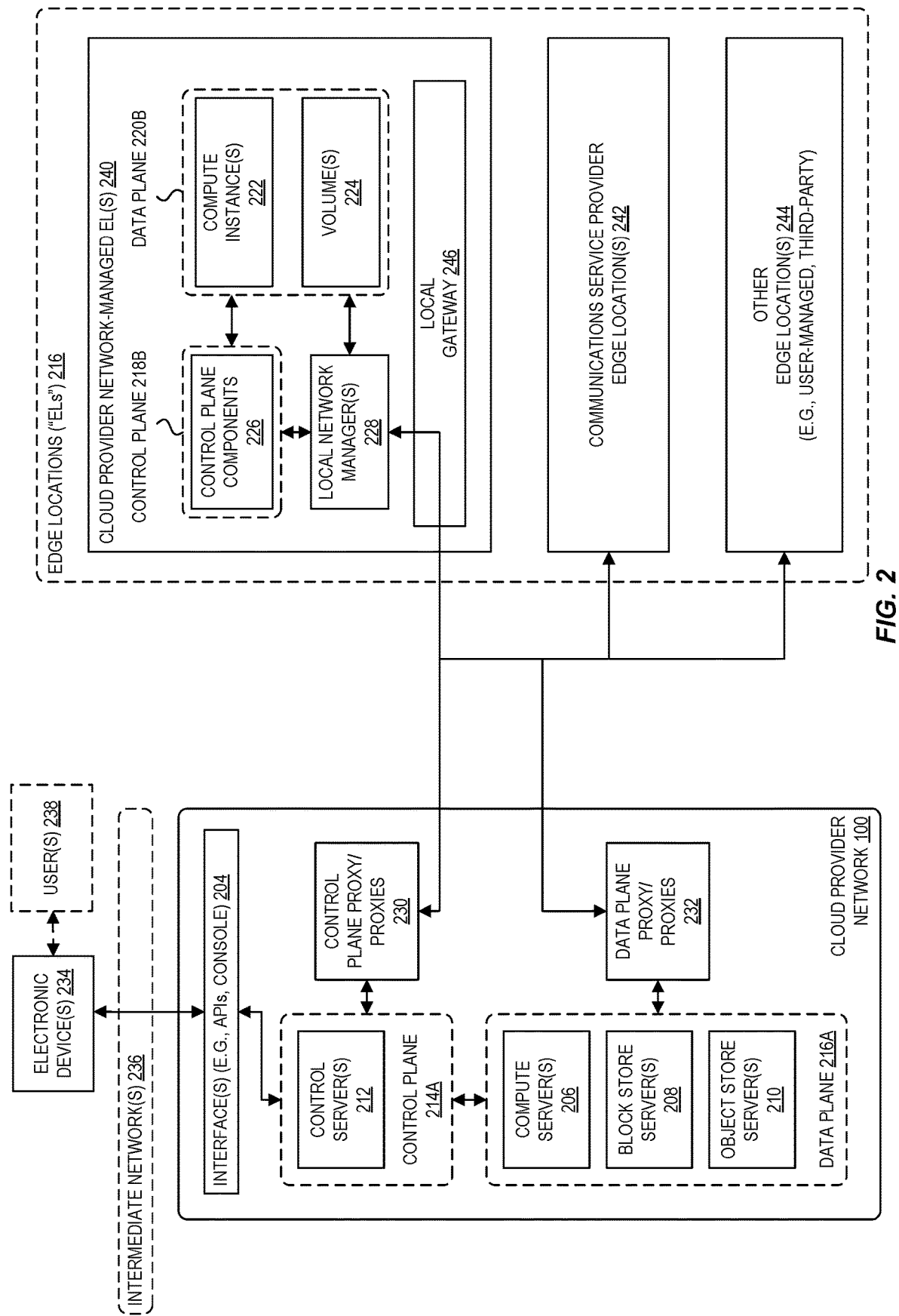
FIG. 2 illustrates an exemplary system including a cloud provider network and further including various edge locations of the cloud provider network according to some embodiments.

Turning ahead, FIG. 2 illustrates an exemplary system including a cloud provider network and further including various edge locations of the cloud provider network according to some embodiments. As introduced earlier, the cloud provider network 100 (sometimes referred to simply as a "cloud") refers to a pool of network-accessible computing resources (such as compute, storage, and networking resources, applications, and services), which can be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device can also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users (e.g., users 238) can connect to virtualized computing devices and other cloud provider network 100 resources and services using various interfaces (e.g., APIs) via one or more intermediate network(s) (e.g., the public Internet). An API refers to an interface and/or communication protocol between a client (e.g., an electronic device 234) and a server, such that if the client makes a request in a predefined format, the client should receive a response in a specific format or cause a defined action to be initiated. In the cloud provider network context, APIs provide a gateway for users to access cloud infrastructure by allowing users to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their users or clients.

The cloud provider network 100 can include a physical network (e.g., sheet metal boxes, cables, rack hardware) referred to as the substrate. The substrate can be considered as a network fabric containing the physical hardware that runs the services of the provider network. The substrate can be isolated from the rest of the cloud provider network 100, for example it may not be possible to route from a substrate network address to an address in a production network that runs services of the cloud provider, or to a user network that hosts user resources.

The cloud provider network 100 can also include an overlay network of virtualized computing resources that run on the substrate. In at least some embodiments, hypervisors or other devices or processes on the network substrate use encapsulation protocol technology to encapsulate and route network packets (e.g., client IP packets) over the network substrate between client resource instances on different hosts within the provider network. The encapsulation protocol technology can be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server 206, a block store server 208, an object store server 210, a control server 212) can have an IP address in the substrate network. Hardware virtualization technology can enable multiple operating systems to run concurrently on a host computer, for example as virtual machines (VMs) on a compute server 206. A hypervisor, or virtual machine monitor (VMM), on a host allocates the host's hardware resources amongst various VMs on the host and monitors the execution of VMs. Each VM can be provided with one or more IP addresses in an overlay network, and the VMM on a host can be aware of the IP addresses of the VMs on the host. The VMMs (and/or other devices or processes on the network substrate) can use encapsulation protocol technology to encapsulate and route network packets (e.g., client IP packets) over the network substrate between virtualized resources on different hosts within the cloud provider network 100. The encapsulation protocol technology can be used on the network substrate to route encapsulated packets between endpoints on the network substrate via overlay network paths or routes. The encapsulation protocol technology can be viewed as providing a virtual network topology overlaid on the network substrate. In some embodiments, the encapsulation protocol technology includes the mapping service that maintains a mapping directory that maps IP overlay addresses (e.g., IP addresses visible to users) to substrate IP addresses (IP addresses not visible to users), which can be accessed by various processes on the cloud provider network for routing packets between endpoints.

As illustrated, the traffic and operations of the cloud provider network substrate can broadly be subdivided into two categories in various embodiments: control plane traffic carried over a logical control plane 214A and data plane operations carried over a logical data plane 216A. While the data plane 216A represents the movement of user data through the distributed computing system, the control plane 214A represents the movement of control signals through the distributed computing system. The control plane 214A generally includes one or more control plane components or services distributed across and implemented by one or more control servers 212. Control plane traffic generally includes administrative operations, such as establishing isolated virtual networks for various users, monitoring resource usage and health, identifying a particular host or server at which a requested compute instance is to be launched, provisioning additional hardware as needed, and so on. The data plane 216A includes user resources that are implemented on the cloud provider network (e.g., computing instances, containers, block storage volumes, databases, file storage). Data plane traffic generally includes non-administrative operations such as transferring data to and from the user resources.

The control plane components are typically implemented on a separate set of servers from the data plane servers, and control plane traffic and data plane traffic can be sent over separate/distinct networks. In some embodiments, control plane traffic and data plane traffic can be supported by different protocols. In some embodiments, messages (e.g., packets) sent over the cloud provider network 100 include a flag to indicate whether the traffic is control plane traffic or data plane traffic. In some embodiments, the payload of traffic is inspected to determine its type (e.g., whether control or data plane). Other techniques for distinguishing traffic types are possible.

As illustrated, the data plane 216A can include one or more compute servers 206, which can be bare metal (e.g., single tenant) or can be virtualized by a hypervisor to run multiple VMs (sometimes referred to as "instances") or microVMs for one or more users. These compute servers 106 can support a virtualized computing service (or "hardware virtualization service") of the cloud provider network. In some embodiments, the virtualized computing service is part of the control plane 214A, allowing users to issue commands via an interface 204 (e.g., an API) to launch and manage compute instances (e.g., VMs, containers) for their applications. In some embodiments, the virtualized computing service offers virtual compute instances with varying computational and/or memory resources. In one embodiment, each of the virtual compute instances corresponds to one of several instance types. An instance type can be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type can be selected for a user, e.g., based (at least in part) on input from the user. For example, a user can choose an instance type from a predefined set of instance types. As another example, a user can specify the desired resources of an instance type and/or requirements of a workload that the instance will run, and the instance type selection functionality can select an instance type based on such a specification.

The data plane 216A can also include one or more block store servers 208, which can include persistent storage for storing volumes of user data as well as software for managing these volumes. These block store servers 208 can support a managed block storage service of the cloud provider network. In some embodiments, the managed block storage service is part of the control plane 214A, allowing users to issue commands via the interface 204 (e.g., an API) to create and manage volumes for their applications running on compute instances. The block store servers 208 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume can be stored as one or more virtualized devices implemented on one or more underlying physical host devices. Volumes can be partitioned a small number of times (e.g., up to 16) with each partition hosted by a different host. The data of the volume can be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). In some embodiments, the client is implemented on an offload card of a server that includes the processing units (e.g., CPUs or GPUs) of the compute instance.

The data plane 216A can also include one or more object store servers 210, which represent another type of storage within the cloud provider network. The object storage servers 210 include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Users can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Users can use buckets to store objects of a variety of types, including machine images that can be used to launch VMs, and snapshots that represent a point-in-time view of the data of a volume.

An edge location 202 provides resources and services of the cloud provider network 100 within a separate network, thereby extending functionality of the cloud provider network 100 to new locations (e.g., for reasons related to latency in communications with user devices, legal compliance, security, etc.). As indicated, such edge locations 202 can include cloud provider network-managed edge locations 140 (e.g., formed by servers located in a cloud provider-managed facility separate from those associated with the cloud provider network 100), communications service provider edge locations 242 (e.g., formed by servers associated with communications service provider facilities), user-managed edge locations 244 (e.g., formed by servers located on-premise in a user or partner facility), among other possible types of substrate extensions.

As illustrated in the example edge location 240, an edge location 202 can similarly include a logical separation between a control plane 218B and a data plane 220B, respectively extending the control plane 214A and data plane 216A of the cloud provider network 100. In some embodiments, the edge location 202 is pre-configured, e.g., by the cloud provider network operator, with an appropriate combination of hardware with software and/or firmware elements to support various types of computing-related resources, and to do so in a manner that mirrors the experience of using the cloud provider network. For example, one or more edge location servers can be provisioned by the cloud provider for deployment within an edge location 202. As described above, in some embodiments, the cloud provider network 100 offers a set of predefined instance types, each having varying types and quantities of underlying hardware resources. Each instance type can also be offered in various sizes. In order to enable users to continue using the same instance types and sizes in an edge location 202 as they do in the region, the servers can be heterogeneous servers. A heterogeneous server can concurrently support multiple instance sizes of the same type and can be also reconfigured to host whatever instance types are supported by its underlying hardware resources. The reconfiguration of the heterogeneous server can occur on-the-fly using the available capacity of the servers, that is, while other VMs are still running and consuming other capacity of the edge location servers. This can improve utilization of computing resources within the edge location by allowing for better packing of running instances on servers, and also provides a seamless experience regarding instance usage across the cloud provider network 100 and the cloud provider network edge location.

As illustrated, the edge location servers can host one or more compute instances 222. Compute instances 222 can be VMs, or containers that package up code and all its dependencies so an application can run quickly and reliably across computing environments (e.g., including VMs). In addition, the servers can host one or more data volumes 224, if desired by the user. In the region of a cloud provider network 100, such volumes can be hosted on dedicated block store servers. However, due to the possibility of having a significantly smaller capacity at an edge location 202 than in the region, an optimal utilization experience may not be provided if the edge location includes such dedicated block store servers. Accordingly, a block storage service can be virtualized in the edge location 202, such that one of the VMs runs the block store software and stores the data of a volume 224. Similar to the operation of a block storage service in the region of a cloud provider network 100, the volumes 224 within an edge location 202 can be replicated for durability and availability. The volumes can be provisioned within their own isolated virtual network within the edge location 202. The compute instances 222 and any volumes 224 collectively make up a data plane extension 220B of the provider network data plane 216A within the edge location 202.

The servers within an edge location 202 can, in some implementations, host certain local control plane components 226, for example, components that enable the edge location 202 to continue functioning if there is a break in the connection back to the cloud provider network 100. Examples of these components include a migration manager that can move compute instances 222 between edge location servers if needed to maintain availability, and a key value data store that indicates where volume replicas are located. However, generally the control plane 218B functionality for an edge location will remain in the cloud provider network 100 to allow users to use as much resource capacity of the edge location as possible.

In some embodiments, the migration manager has a centralized coordination component that runs in region as well as local controllers that run on the PSE servers (and servers in the cloud provider's data centers). The centralized coordination component can identify target edge locations and/or target hosts when a migration is triggered, while the local controllers can coordinate the transfer of data between the source and target hosts. The described movement of the resources between hosts in different locations can take one of several forms of migration. Migration refers to moving virtual machine instances (and/or other resources) between hosts in a cloud computing network, or between hosts outside of the cloud computing network and hosts within the cloud. There are different types of migration including live migration and reboot migration. During a reboot migration, the user experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine can be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the user—which should be kept as short as possible. In the presently disclosed migration techniques this can be especially challenging, as resources are being moved between hosts in geographically separate locations which may be connected over one or more intermediate networks. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis can be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

In some embodiments, server software running at an edge location 202 is designed by the cloud provider to run on the cloud provider substrate network and this software can be enabled to run unmodified in an edge location 202 by using local network manager(s) 228 to create a private replica of the substrate network within the edge location (a "shadow substrate"). The local network manager(s) 228 can run on edge location 202 servers and bridge the shadow substrate with the edge location 202 network, for example, by acting as a VPN endpoint or endpoints between the edge location 202 and the proxies 230, 232 in the cloud provider network 100 and by implementing the mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) 228 allow resources in the edge location 202 to seamlessly communicate with resources in the cloud provider network 100. In some implementations, a single local network manager can perform these actions for all servers hosting compute instances 222 in an edge location 202. In other implementations, each of the server hosting compute instances 222 have a dedicated local network manager. In multi-rack edge locations, inter-rack communications can go through the local network managers, with local network managers maintaining open tunnels to one another.

Provider substrate extension locations can utilize secure networking tunnels through the edge location 202 network to the cloud provider network 100, for example, to maintain security of user data when traversing the edge location 202 network and any other intermediate network (which can include the public internet). Within the cloud provider network 100, these tunnels are composed of virtual infrastructure components including isolated virtual networks (e.g., in the overlay network), control plane proxies 230, data plane proxies 232, and substrate network interfaces. In some embodiments, such proxies are implemented as containers running on compute instances. In some embodiments, each server in an edge location 202 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network manages the cloud provider network-side lifecycle of these tunnels and their components, for example, by provisioning them automatically when needed and maintaining them in a healthy operating state. In some embodiments, a direct connection between an edge location 202 location and the cloud provider network 100 can be used for control and data plane communications. As compared to a VPN through other networks, the direct connection can provide constant bandwidth and more consistent network performance because of its relatively fixed and stable network path.

A control plane (CP) proxy 230 can be provisioned in the cloud provider network 100 to represent particular host(s) in an edge location. CP proxies are intermediaries between the control plane 214A in the cloud provider network 100 and control plane targets in the control plane 218B of edge location 202. That is, CP proxies 230 provide infrastructure for tunneling management API traffic destined for edge location servers out of the region substrate and to the edge location 202. For example, a virtualized computing service of the cloud provider network 100 can issue a command to a VMM of a server of an edge location 202 to launch a compute instance 222. A CP proxy maintains a tunnel (e.g., a VPN tun) to a local network manager 228 of the edge location. The software implemented within the CP proxies ensures that only well-formed API traffic leaves from and returns to the substrate. CP proxies provide a mechanism to expose remote servers on the cloud provider substrate while still protecting substrate security materials (e.g., encryption keys, security tokens) from leaving the cloud provider network 100. The one-way control plane traffic tunnel imposed by the CP proxies also prevents any (potentially compromised) devices from making calls back to the substrate. CP proxies can be instantiated one-for-one with servers at an edge location 202 or can manage control plane traffic for multiple servers in the same edge location.

A data plane (DP) proxy 232 can also be provisioned in the cloud provider network 100 to represent particular server(s) in an edge location 202. The DP proxy 232 acts as a shadow or anchor of the server(s) and can be used by services within the cloud provider network 100 to monitor health of the host (including its availability, used/free compute and capacity, used/free storage and capacity, and network bandwidth usage/availability). The DP proxy 232 also allows isolated virtual networks to span edge locations 202 and the cloud provider network 100 by acting as a proxy for server(s) in the cloud provider network 100. Each DP proxy 232 can be implemented as a packet-forwarding compute instance or container. As illustrated, each DP proxy 232 can maintain a VPN tunnel with a local network manager 228 that manages traffic to the server(s) that the DP proxy 232 represents. This tunnel can be used to send data plane traffic between the edge location server(s) and the cloud provider network 100. Data plane traffic flowing between an edge location 202 and the cloud provider network 100 can be passed through DP proxies 232 associated with that edge location. For data plane traffic flowing from an edge location 202 to the cloud provider network 100, DP proxies 232 can receive encapsulated data plane traffic, validate it for correctness, and allow it to enter into the cloud provider network 100. DP proxies 232 can forward encapsulated traffic from the cloud provider network 100 directly to an edge location 202.

Local network manager(s) 228 can provide secure network connectivity with the proxies 230, 232 established in the cloud provider network 100. After connectivity has been established between the local network manager(s) 228 and the proxies, users may issue commands via the interface 204 to instantiate compute instances (and/or perform other operations using compute instances) using edge location resources in a manner analogous to the way in which such commands would be issued with respect to compute instances hosted within the cloud provider network 100. From the perspective of the user, the user can now seamlessly use local resources within an edge location (as well as resources located in the cloud provider network 100, if desired). The compute instances set up on a server at an edge location 202 can communicate both with electronic devices located in the same network as well as with other resources that are set up in the cloud provider network 100, as desired. A local gateway 246 can be implemented to provide network connectivity between an edge location 202 and a network associated with the extension (e.g., a communications service provider network in the example of an edge location 242).

There may be circumstances that necessitate the transfer of data between the object storage service and an edge location 202. For example, the object storage service may store machine images used to launch VMs as well as snapshots representing point-in-time backups of volumes. The object gateway can be provided on a PSE server or a specialized storage device, and provide users with configurable, per-bucket caching of object storage bucket contents in their PSE to minimize the impact of PSE-region latency on the user's workloads. The object gateway can also temporarily store snapshot data from snapshots of volumes in the PSE and then sync with the object servers in the region when possible. The object gateway can also store machine images that the user designates for use within the PSE or on the user's premises. In some implementations, the data within the PSE can be encrypted with a unique key and the cloud provider can limit keys from being shared from the region to the PSE for security reasons. Accordingly, data exchanged between the object store servers and the object gateway can utilize encryption, decryption, and/or re-encryption in order to preserve security boundaries with respect to encryption keys or other sensitive data. The transformation intermediary can perform these operations, and a PSE bucket can be created (on the object store servers) to store snapshot and machine image data using the PSE encryption key.

In the manner described above, a PSE 202 forms an edge location, in that it provides the resources and services of the cloud provider network outside of a traditional cloud provider data center and closer to user devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a user workload and that may be distant from any availability zones). Such edge locations may be referred to as "far zones" (due to being far from other availability zones) or "near zones" (due to being near to user workloads). A near zone can be connected in various ways to a publicly accessible network such as the public internet, for example directly, via another network, or via a private connection to a region. Although typically a near zone would have more limited capacity than a region, in some cases a near zone can have substantial capacity, for example, thousands of racks or more.

In some implementations, an edge location is an extension of the cloud provider network substrate formed by one or more servers located on-premises in a user or partner facility, wherein such server(s) communicate over a network (e.g., a publicly accessible network such as the internet) with a nearby availability zone or region of the cloud provider network. This type of substrate extension located outside of cloud provider network data centers can be referred to as an "outpost" of the cloud provider network. Some outposts can be integrated into communications networks, for example, as a multi-access edge computing (MEC) site having physical infrastructure spread across telecommunication data centers, telecommunication aggregation sites, and/or telecommunication base stations within the telecommunication network. In the on-premises example, the limited capacity of the outpost may be available for use only be the user who owns the premises (and any other accounts allowed by the user). In the telecommunications example, the limited capacity of the outpost can be shared amongst any number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with user resources, and/or features that enable the edge location to continue functioning when disconnected from the parent availability zone) can also be present in some edge locations. Thus, in the above examples, an edge location refers to an extension of at least data plane capacity that is positioned at the edge of the cloud provider network, close to user devices and/or workloads.

Figure 3:
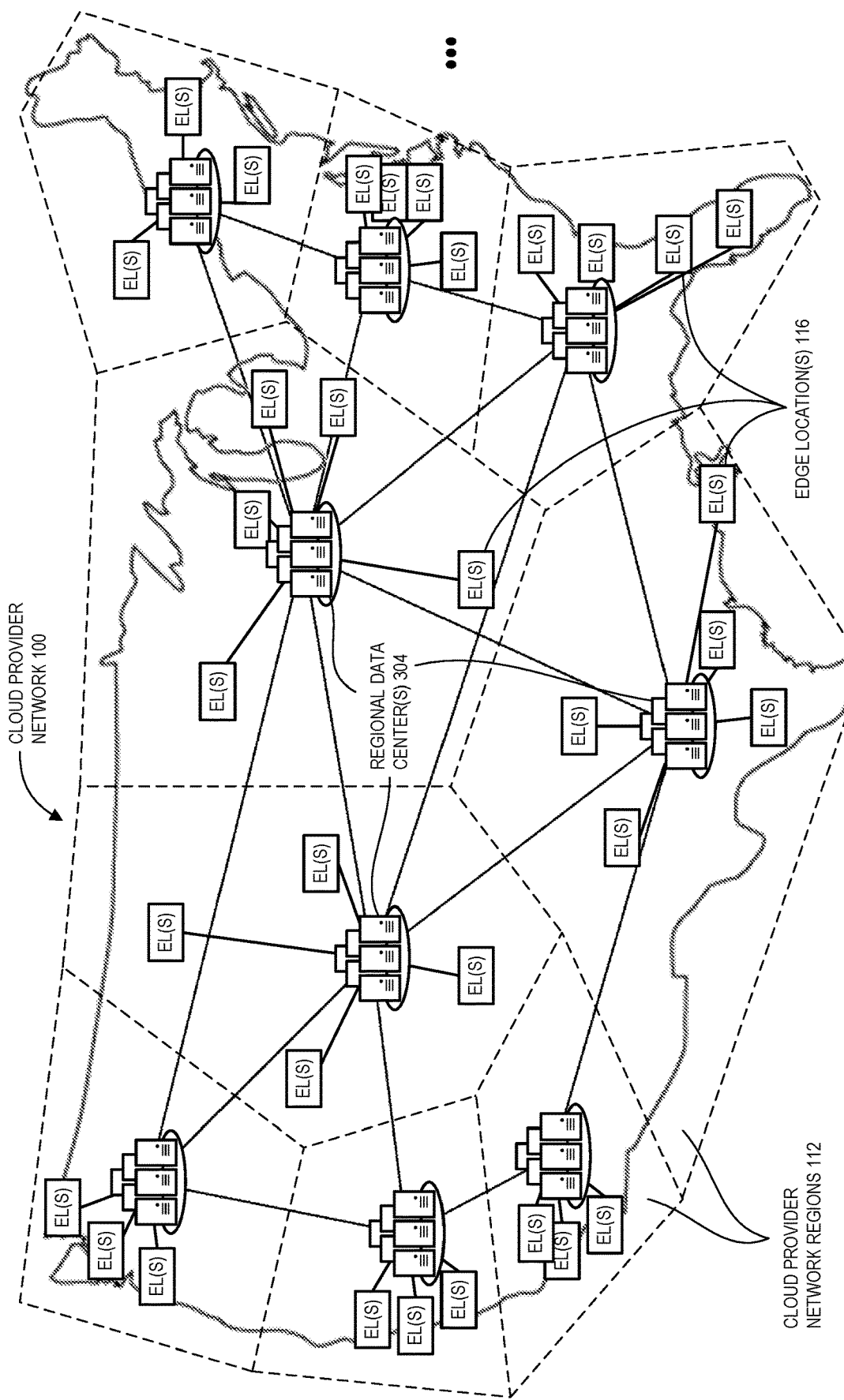
FIG. 3 illustrates an exemplary cloud provider network including geographically dispersed edge locations according to some embodiments.

FIG. 3 illustrates an exemplary cloud provider network including geographically dispersed edge locations according to some embodiments. As illustrated, a cloud provider network 100 can be formed as a number of regions 112, where a region is a separate geographical area in which the cloud provider has one or more data centers 304. Each region 112 can include two or more AZs connected to one another via a private high-speed network such as, for example, a fiber communication connection.

In comparison to the number of regional data centers or AZs, the number of edge locations 116 can be much higher. Such widespread deployment of edge locations 116 can provide low-latency connectivity to the cloud for a much larger group of end user devices (in comparison to those that happen to be very close to a regional data center). In some embodiments, each edge location 116 can be peered to some portion of the cloud provider network 100 (e.g., a parent availability zone or regional data center). Such peering allows the various components operating in the cloud provider network 100 to manage the compute resources of the edge location. In some cases, multiple edge locations are sited or installed in the same facility (e.g., separate racks of computer systems) and managed by different zones or data centers to provide additional redundancy. Note that although edge locations are typically depicted herein as within a CSP network, in some cases, such as when a cloud provider network facility is relatively close to a communications service provider facility, the edge location can remain within the physical premises of the cloud provider network while being connected to the communications service provider network via a fiber or other network link.

An edge location 116 can be structured in several ways. In some implementations, an edge location 116 can be an extension of the cloud provider network substrate including a limited quantity of capacity provided outside of an AZ (e.g., in a small data center or other facility of the cloud provider that is located close to a user workload and that may be distant from any AZs). Such edge locations may be referred to as "local zones" (due to being more local or proximate to a large group of users, industry, or IT centers, than traditional AZs. A local zone can be connected in various ways to a publicly accessible network such as the Internet, for example directly, via another network, or via a private connection to a region. Although typically a local zone would have more limited capacity than a region, in some cases a local zone can have substantial capacity, for example thousands of racks or more. Some local zones use similar infrastructure as typical cloud provider data centers instead of the edge location infrastructure described herein.

The parenting of a given edge location to an AZ or region of the cloud provider network can be based on a number of factors. One such parenting factor is data sovereignty. For example, to keep data originating from a particular CSP network in one country within that same country, the edge locations deployed within that CSP network can be parented to AZs or regions within that country. Another factor may be the availability of services. For example, some edge locations can have different hardware configurations such as the presence or absence of components such as local non-volatile storage for user data (e.g., solid state drives), graphics accelerators, etc. Some AZs or regions might lack the services to exploit those additional resources, thus, an edge location could be parented to an AZ or region that supports the use of those resources. Another factor can be the latency between the AZ or region and the edge location. While the deployment of edge locations within a CSP network has latency benefits, those benefits might be negated by parenting an edge location to a distant AZ or region that introduces significant latency for edge location to region traffic. Accordingly, edge locations are often parented to nearby (in terms of network latency) AZs or regions.

In some embodiments, a provider network includes a hardware virtualization service. A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some embodiments, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

In some embodiments, a provider network includes a container service. A container service can be a container orchestration and management service (referred to in various implementations as a container service, cloud container service, container engine, or container cloud service) that allows users of the cloud provider network to instantiate and manage containers. In some embodiments the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

Figure 4:
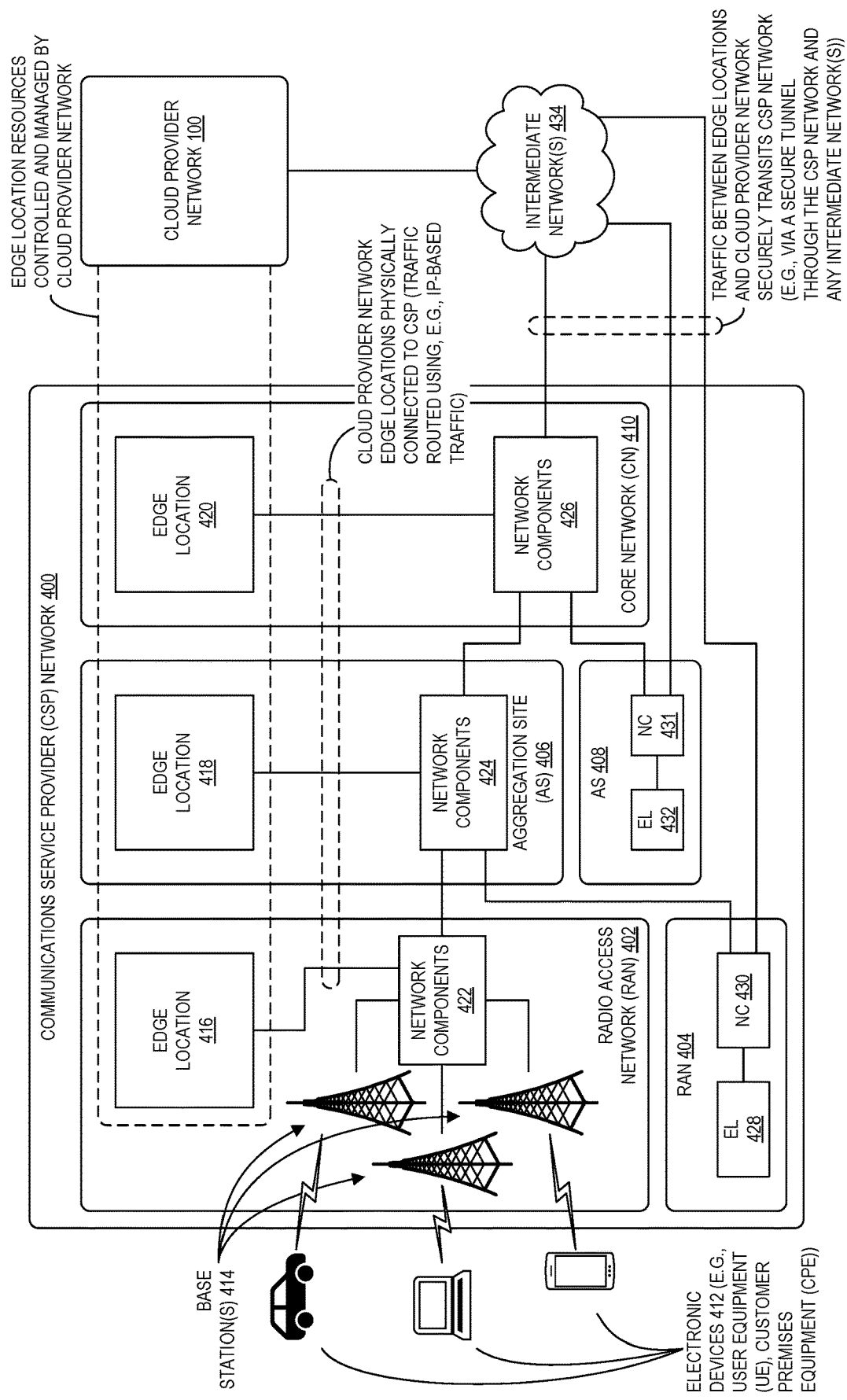
FIG. 4 illustrates an exemplary system in which cloud provider network substrate extensions are deployed within a communications service provider network according to some embodiments.

FIG. 4 illustrates an exemplary system in which cloud provider network edge locations are deployed within a communications service provider network according to some embodiments. A CSP network 400 generally includes a downstream interface to end user electronic devices and an upstream interface to other networks (e.g., the internet). In this example, the CSP network 400 is a wireless "cellular" CSP network that includes radio access networks (RAN) 402, 404, aggregation sites (AS) 406, 408, and a core network (CN) 410. The RANs 402, 404 include base stations (e.g., NodeBs, eNodeBs, gNodeBs) that provide wireless connectivity to electronic devices 412. The core network 410 typically includes functionality related to the management of the CSP network (e.g., billing, mobility management, etc.) and transport functionality to relay traffic between the CSP network and other networks. Aggregation sites 406, 408 can serve to consolidate traffic from many different radio access networks to the core network and to direct traffic originating from the core network to the various radio access networks.

From left to right in FIG. 4, end user electronic devices 412 wirelessly connect to base stations (or radio base stations) 414 of a radio access network 402. Such electronic devices 412 are sometimes referred to as user equipment (UE) or customer premises equipment (CPE). Data traffic is often routed through a fiber transport network consisting of multiple hops of layer 3 routers (e.g., at aggregation sites) to the core network 410. The core network 410 is typically housed in one or more data centers. For data traffic destined for locations outside of the CSP network 400, the network components 422-426 typically include a firewall through which traffic can enter or leave the CSP network 400 to external networks such as the internet or a cloud provider network 100. Note that in some embodiments, the CSP network 400 can include facilities to permit traffic to enter or leave from sites further downstream from the core network 410 (e.g., at an aggregation site or RAN).

Edge locations 416-420 (or, "wavelength zones") include computing resources managed as part of a cloud provider network but installed or sited within various points of a CSP network (e.g., on premise in a CSP owned or leased space). The computing resources typically provide some amount of compute and memory capacity that the cloud provider can allocate for use by its users. The computing resources can further include storage and accelerator capacity (e.g., solid-state drives, graphics accelerators, etc.). Here, edge locations 416, 418, and 420 are in communication with a cloud provider network 100.

Typically, the further—e.g., in terms of network hops and/or distance—an edge location is from the cloud provider network 100 (or closer to electronic devices 412), the lower the network latency is between computing resources within the edge location and the electronic devices 412. However, physical site constraints often limit the amount of edge location computing capacity that can be installed at various points within the CSP or determine whether computing capacity can be installed at various points at all. For example, an edge location sited within the core network 410 can typically have a much larger footprint (in terms of physical space, power requirements, cooling requirements, etc.) than an edge location sited within the RAN 402, 404.

The installation or siting of edge locations within a CSP network can vary subject to the particular network topology or architecture of the CSP network. As indicated in FIG. 4, edge locations can generally be connected anywhere the CSP network can break out packet-based traffic (e.g., IP based traffic). Additionally, communications between a given edge location and the cloud provider network 100 typically securely transit at least a portion of the CSP network 400 (e.g., via a secure tunnel, virtual private network, a direct connection, etc.). In the illustrated example, the network components 422 facilitate the routing of data traffic to and from an edge location 416 integrated with the RAN 402, the network components 424 facilitate the routing of data traffic to and from an edge location 418 integrated with the AS 406, and the network components 426 facilitate the routing of data traffic to and from an edge location 420 integrated with the CN 410. Network components 422-426 can include routers, gateways, or firewalls. To facilitate routing, the CSP can allocate one or more IP addresses from the CSP network address space to each of the edge locations.

In 5G wireless network development efforts, edge locations may be considered a possible implementation of Multi-access Edge Computing (MEC). Such edge locations can be connected to various points within a CSP 5G network that provide a breakout for data traffic as part of the User Plane Function (UPF). Older wireless networks can incorporate edge locations as well. In 3G wireless networks, for example, edge locations can be connected to the packet-switched network portion of a CSP network, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC).

In some embodiments, traffic between an edge location 428 and the cloud provider network 100 can be broken out of the CSP network 400 without routing through the core network 410. For example, network components 430 of a RAN 404 can be configured to route traffic between an edge location 416 of the RAN 404 and the cloud provider network 100 without traversing an aggregation site or core network 410. As another example, network components 431 of an aggregation site 408 can be configured to route traffic between an edge location 432 of the aggregation site 408 and the cloud provider network 100 without traversing the core network 410. The network components 430, 431 can include a gateway or router having route data to direct traffic from the edge location destined for the cloud provider network 100 to the cloud provider network 100 (e.g., through a direct connection or an intermediate network 434) and to direct traffic from the cloud provider network 100 destined for the edge location to the edge location.

In some embodiments, edge locations can be connected to more than one CSP network. For example, when two CSPs share or route traffic through a common point, an edge location can be connected to both CSP networks. For example, each CSP can assign some portion of its network address space to the edge location, and the edge location can include a router or gateway that can distinguish traffic exchanged with each of the CSP networks. For example, traffic destined for the edge location from one CSP network might have a different destination IP address, source IP address, and/or virtual local area network (VLAN) tag than traffic received from another CSP network. Traffic originating from the edge location to a destination on one of the CSP networks can be similarly encapsulated to have the appropriate VLAN tag, source IP address (e.g., from the pool allocated to the edge location from the destination CSP network address space) and destination IP address.

Note that while the exemplary CSP network architecture of FIG. 4 includes radio access networks, aggregation sites, and a core network, the architecture of a CSP network can vary in naming and structure across generations of wireless technology, between different CSPs, as well as between wireless and fixed-line CSP networks. Additionally, while FIG. 4 illustrates several locations where an edge location can be sited within a CSP network, other locations are possible (e.g., at a base station).

Figure 5:
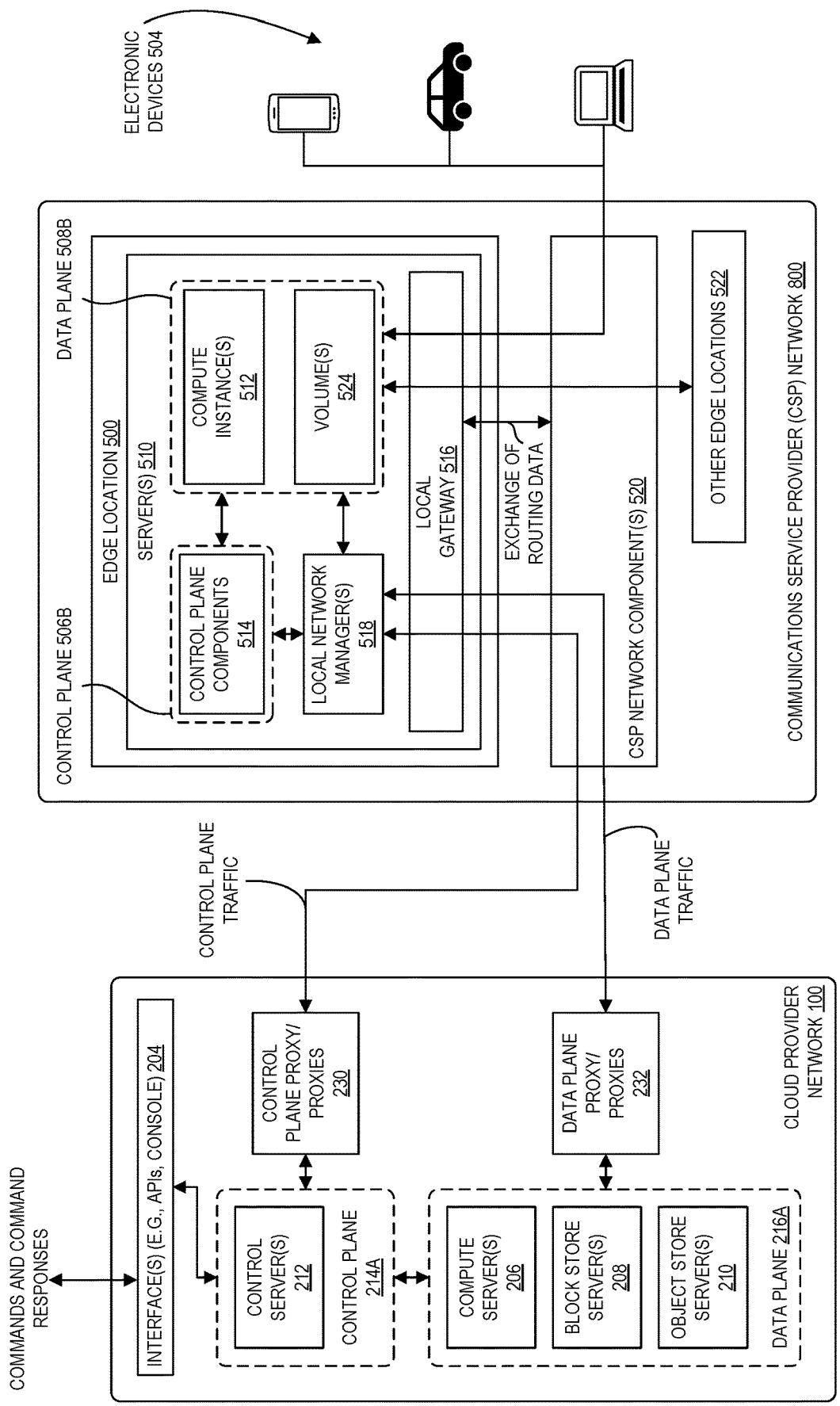
FIG. 5 illustrates in greater detail exemplary components of and connectivity between a cloud provider network and an edge location within a communications service provider network according to some embodiments.

FIG. 5 illustrates in greater detail exemplary components of and connectivity between a cloud provider network and an edge location within a CSP network according to some embodiments. An edge location 500 provides resources and services of the cloud provider network within a CSP network 502 thereby extending functionality of the cloud provider network 100 to be closer to end user devices 504 connected to the CSP network.

The edge location 500 similarly includes a logical separation between a control plane 506B and a data plane 508B, respectively extending the control plane 214A and data plane 216A of the cloud provider network 100. The edge location 500 can be pre-configured, e.g., by the cloud provider network operator, with an appropriate combination of hardware with software and/or firmware elements to support various types of computing-related resources, and to do so in a manner that mirrors the experience of using the cloud provider network. For example, one or more edge location servers 510 can be provisioned by the cloud provider for deployment within the CSP network 502.

The servers 510 within an edge location 500, in some implementations, host certain local control plane components 514, for example, components that enable the edge location 500 to continue functioning if there is a break in the connection back to the cloud provider network 100. Further, certain controller functions can typically be implemented locally on data plane servers, even in the cloud provider datacenters—for example, a function for collecting metrics for monitoring instance health and sending them to a monitoring service, and a function for coordinating transfer of instance state data during live migration. However, generally the control plane 506B functionality for an edge location 500 will remain in the cloud provider network 100 in order to allow users to use as much resource capacity of the edge location as possible.

As illustrated, the edge location servers 510 can host compute instances 512. Compute instances can be VMs, microVMs, or containers that package up code and all its dependencies so an application can run quickly and reliably across computing environments (e.g., including VMs). Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In some embodiments, the execution of edge-optimized compute instances is supported by a lightweight virtual machine manager (VMM) running on the servers 510 upon which edge-optimized compute instances are launched based on application profiles. These VMMs enable the launch of lightweight micro-virtual machines (microVMs) in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there can be one or more vCPU threads (one per guest CPU core).

In addition, the servers 510 can host one or more data volumes 524, if desired by the user. The volumes can be provisioned within their own isolated virtual network within the edge location 500. The compute instances 512 and any volumes 524 collectively make up a data plane extension 508B of the provider network data plane 216A within the edge location 500.

A local gateway 516 can be implemented to provide network connectivity between the edge location 300 and the CSP network 502. The cloud provider can configure the local gateway 516 with an IP address on the CSP network 502 and to exchange routing data (e.g., via the Border Gateway Protocol (BGP)) with the CSP network components 520. The local gateway 516 can include one or more route tables that control the routing of inbound traffic to the edge location 500 and outbound traffic leaving the edge location 500. The local gateway 516 can also support multiple VLANs in cases where the CSP network 502 uses separate VLANs for different portions of the CSP network 502 (e.g., one VLAN tag for the wireless network and another VLAN tag for a fixed network).

In some embodiments of an edge location 500, the extension includes one or more switches, sometimes referred to top of rack (ToR) switches (e.g., in rack-based embodiments). The ToR switches are connected to CSP network routers (e.g., CSP network components 520), such as Provider Edge (PE) or Software Defined Wide Area Network (SD-WAN) routers. Each ToR switch can include an uplink Link Aggregation (LAG) interface to the CSP network router supporting multiple physical links per LAG (e.g., 1G/10G/40G/100G). The links can run Link Aggregation Control Protocol (LACP) and be configured as IEEE802.1q trunks to enable multiple VLANs over the same interface. Such a LACP-LAG configuration allows an edge location management entity of the control plane of the cloud provider network 100 to add more peering links to an edge location without adjustments to routing. Each of the ToR switches can establish eBGP sessions with the carrier PE or SD-WAN routers. The CSP can provide a private Autonomous System Number (ASN) for the edge location and an ASN of the CSP network 502 to facilitate the exchange of routing data.

Data plane traffic originating from the edge location 500 can have a number of different destinations. For example, traffic addressed to a destination in the data plane 216A of the cloud provider network 100 can be routed via the data plane connection between the edge location 500 and the cloud provider network 100. The local network manager 518 can receive a packet from a compute instance 512 addressed to, for example, another compute instance in the cloud provider network 100 and encapsulate the packet with a destination as the substrate IP address of the server hosting the other compute instance before sending it to the cloud provider network 100 (e.g., via a direct connection or tunnel). For traffic from a compute instance 512 addressed to another compute instance hosted in another edge location 522, the local network manager 518 can encapsulate the packet with a destination as the IP address assigned to the other edge location 522, thereby allowing the CSP network components 520 to handle the routing of the packet. Alternatively, if the CSP network components 520 do not support inter-edge location traffic, the local network manager 518 can address the packet to a relay in the cloud provider network 100 that can send the packet to the other edge location 522 via its data plane connection (not shown) to the cloud provider network 100. Similarly, for traffic from a compute instance 512 address to a location outside of the CSP network 502 or the cloud provider network 100 (e.g., on the internet), if the CSP network components 520 permit routing to the internet, the local network manager 518 can encapsulate the packet with a source IP address corresponding to the IP address in the carrier address space assigned to the compute instance 512. Otherwise, the local network manager 518 can send the packet to an Internet Gateway in the cloud provider network 100 that can provide internet connectivity for the compute instance 512. For traffic from a compute instance 512 addressed to an electronic device 504, the local gateway 516 can use Network Address Translation (NAT) to change the source IP address of the packet from an address in an address space of the cloud provider network to an address space of the carrier network.

The local gateway 516, local network manager(s) 518 and other local control plane components 514 can run on the same servers 510 that host compute instances 512, can run on a dedicated processor (e.g., on an offload card) integrated with edge location servers 510 or can be executed by servers separate from those that host user resources.

Turning back to FIG. 1, there are many complexities that application developers face when trying to implement distributed applications using cloud provider networks. For example, it is difficult to select which locations to deploy service components to in order to optimize application-to-end user latency and costs, to distribute the application and its data across multiple locations, to optimize compute capacity across locations from a global capacity budget, to connect external (e.g., over mobile/internet) and internal (e.g., between microservices) client requests to a closest possible location, and to operate, monitor, and adjust a distributed application as it is used by different users over time. Accordingly, in some embodiments a SOADM service 102 provides an edge compute fabric that abstracts away these complexities so that developers may not need select where to deploy their application components, manage deployment processes to specific locations, or optimize capacity as traffic fluctuates. Instead, users can provide configuration data for an application and the SOADM service 102 can dynamically adapt the application to changing end user locations and call volumes.

Embodiments of the SOADM service 102 disclosed herein enable users to more easily build highly available and/or latency-sensitive applications that will run seamlessly across multiple deployment zones (and various types thereof) using, for example, AZs, local zones (LZs), wavelength zones (WZs), etc., abstracting away all the complexities that arise with managing applications across many locations.

To do this, the SOADM service 102 in some embodiments provides users with a single management interface (e.g., via API, web-based console, etc.) to manage their highly distributed applications. This SOADM service 102 can then dynamically select locations to deploy user applications, orchestrate underlying compute and networking resources, and streamline the collection of observability telemetry to a central location. The SOADM service 102 thus presents a new paradigm for users via use of a deployment model for both infrastructure and application code that supports this distributed application model.

The SOADM service 102, in some embodiments, provides a global deployment experience that enables users to specify certain aspects of an application's deployment behavior such as rollout cadence, validation steps, auto-rollback configurations, and the like, and then manages the underlying sequencing of deployment locations and low-level deployment activities. The SOADM service 102 can also deploy supporting infrastructure such as virtual private networks, load balancers, service endpoints, routers, monitoring service alarm functionality, etc., to helpful locations. Thus, the SOADM service 102 deployment model enables its users to leverage deployment best practices and to manage the complexity of deploying code and infrastructure updates across dynamic sets of deployment locations.

The SOADM service 102 also provides latency-based scaling for components of a user application, which allows the application to be scaled to new locations to accommodate changes in localized demand, site availability, capacity availability, etc. For example, if a user's application is configured to be distributed in a distribution group (e.g., a logical collection of one or more regions of the provider network) the SOADM service 102 can scale components of the application into edge locations (e.g., local zones, wavelength zones) close to a location experiencing an influx of client connectivity for the application—e.g., into locations near or in the city of Los Angeles, for example. The SOADM service 102 can further be user-configured to balance scale-out decisions with user-specified constraints such as a maximum number of locations the service can exist in, particular deployment zone types that the application can be placed in, a maximum or minimum number of compute instances (or other computing resource units) for particular components or the application as a whole, etc. Thus, the SOADM service 102 can monitor global traffic data for a user's application and analyze it—along with information about capacity utilization and deployment location "health"—to identify more-optimal locations to deploy additional application capacity to and/or where to remove application capacity from.

For example, at circle (1) a user 104 (e.g., a software application developer) uses their electronic device 106 (e.g., a computing device such as a laptop computer, personal computer, tablet, smart phone, or the like) to interact with the SOADM service 102 to provide configuration data 120 for their application. In some embodiments, the SOADM service 102 provides the user 104 (via the electronic device 106) a graphical user interface (GUI) such as via a web application or standalone application that the user can utilize to configure their application, and in some embodiments, the user uses another means (e.g., a text editor or other application) to provide configuration data and the electronic device 106 may issue API calls to the SOADM service 102.

To define the configuration data 120 for the application, one—or multiple—API calls or commands are transmitted at circle (1). In this description, an example using multiple API calls is used (and is further detailed herein with reference to subsequent figures) though it is to be understood that in various embodiments more, fewer, and/or different commands are implemented based on the desires of the implementor and thus these calls are to be viewed as illustrative and not limiting.

In some embodiments, the configuration data 120 defines a service group 122 for an application, which can include one or more service configurations 124 (corresponding to each type of service/micro-service/component of the application), zero or more service resource configurations 126 (associated with one of the services and corresponding to a resource—such as a virtual block storage volume, data store, database, or other component—that the service depends upon), one or more distribution strategies 128 (each associated with a service and indicating where the service can be deployed), one or more deployment configurations 130 (associated with a service group and indicating how the service is to be deployed), and potentially other types of configuration data.

For example, a user can create a service group 122 configuration associated with one or more service configurations 124 that each represent a set of compute infrastructure (e.g., containers, virtual machines, executables, code, etc.) and underlying infrastructure for a service of the application.

A service group refers to a logical grouping of related services and the service resources they depend on. Services within a service group can communicate with each other via private networking, and services can be limited to only be able to access resources that are defined within the same service group. A service group effectively acts as logical partition for services and resources.

A service, as used herein, is a core compute construct in the deployment model provided by the SOADM service 102. A service represents a set of software dependencies (e.g., containers) packaged together and deployed to various locations along with supporting infrastructure (e.g., a load balancer, block storage, etc.). Each instance of a service can be generated by a template called a service configuration. The service configuration enables the user to define characteristics of the underlying infrastructure for a service instance including where they would like it deployed (via a distribution strategy) and how they would like it deployed (via a deployment configuration). When updates are made to a service configuration, in some embodiments, the SOADM service 102 generates a version identifier that can then be referenced in a deployment. Also encapsulated within the service configuration, in some embodiments, is a service template that defines a location-agnostic resource configuration that can be used to define a set of compute resources that make up an application.

The user can also create one or more service resource configurations, corresponding to service resources, that defines a resource (e.g., of the cloud provider network) that supports a service and that the service may depend upon to operate correctly. In some cases, a service resource is managed by the SOADM service 102, though in other cases a service resource is managed manually by the user. Fully-managed resources can be specified either via a "launch template" (such as the CloudFormation templates provided by the AWS CloudFormation (TM) service) or can be initialized from an existing resource in the user's account. Either way, the end result is a resource that is distributed by the SOADM service 102 in order to best suit the needs of the services that depend on them. Self-managed resources, in some embodiments, can be defined by the user referencing an existing resource in the user's account and, in some embodiments, may not be replicated or modified by the SOADM service 102, though in other embodiments the user indicates that a resource may be replicated, modified, etc.

The user can also create a distribution strategy 128, for a given service, that serves as the construct that influences where the SOADM service 102 deploys a given service. Users can optionally provide a global minimum and/or maximum amount of compute capacity (e.g., a number of containers or VMs used for the service at a minimum or maximum), and/or a list of distribution groups to target along with weighting to tell the SOADM service 102 how to distribute the global capacity between those distribution groups.

A distribution group is a logical group of locations that share a capacity pool for a user's application. A distribution group can be made up of a single region of the cloud provider network, inclusive of any local zones and/or wavelength zones that it parents (e.g., that rely at least partially on control plane components within that region), and/or a larger geographical unit made up of an explicit or derivable group of regions—for example, a "United States" distribution group can include all regions within the United States. A key characteristic of a distribution group is that the SOADM service 102 may consider all regions within a distribution group to be equivalent and may thus distribute compute and other resources to any location within the distribution group as needed to keep the capacity pool at its expected level. One benefit provided by logical distribution groups—such as "United States" or "United States East"—is that they can automatically incorporate new regions (that logically belong to those groups) as they are created, and thus no re-configuration is necessary for user applications to make use of new regions or other deployment zone types or locations that are associated with the distribution group.

The user can also create a deployment configuration 130 that defines how the user wants to deploy updates to their application. As part of this configuration, a user can specify attributes that apply to the global deployment and optionally also provide configuration data that applies to deployment activities at a particular level, e.g., at a network border group level. Thus, the deployment configuration 130 can specify the type of deployment the SOADM service 102 will use, how fast to deploy the changes, how to validate the deployment, and the like. In some embodiments, there are two main components of a deployment configuration—a set of configuration data items that governs the overall global deployment from start to finish, and a deployment unit configuration that specifies how the underlying deployment system will update and validate the application in each network border group.

With a complete set of configuration data 120 for an application, a user can instruct the SOADM service 102 to run (or deploy) the application by sending a message carrying (or otherwise indicating) a command to run the application. In response, at circle (2), the deployment engine 132 obtains the configuration data 120 and optionally capacity information from a capacity service 136 (identifying different deployment zones, available capacity therein (e.g., container or VM "slots" available for usage at each deployment zone), performance and/or availability and/or network information about those deployment zones, and the like), and determine an initial set of locations to deploy the service(s) associated with the service group 122 to that is adherent to the information provided in the configuration data 120—namely, that numbers of service instances and any needed service resources for the services in the service group are deployed to particular allowable deployment zones 118 in a manner consistent with this data.

For example, the SOADM service 102 may obtain the configuration data 120 and identify, for each service, which types of deployment zones may be used (e.g., only AZs, or perhaps AZs and local zones and outposts and wavelength zones) as well as what deployment groups or regions may be used (e.g., only "united states west" region, or "any region within a United States deployment group"). Further, other user-configured preferences can be obtained, such as optional user-defined weightings associated with particular deployment locations (e.g., deployment groups), etc. With the set of candidate locations, the SOADM service 102 can identify a complete set of specific candidate deployment locations (e.g., AZ #1, AZ #2, AZ #3, local zone #50, local zone #55, wavelength zone #1, wavelength zone #2, wavelength zone #3). Further, the SOADM service 102 can obtain capacity information indicating what resources are available to be used at each of these specific candidate deployment locations—e.g., a number and/or type of "slots" available for service instances at those locations, as well as location/latency information indicating where those locations are located from a geographic (e.g., within Los Angeles) or network (e.g., within or connected to a particular cellular provider network) standpoint.

Based at least in part on this information, the SOADM service 102 can determine where to initially deploy the necessary resources for the service group. This placement may be localized at the beginning (e.g., only deploy to locations within or associated with a first region) and then scaled as needed based on client traffic/latency, distributed at the beginning (e.g., by placing resources in a wide number of locations, such as all locations or a random sampling of locations) and again scaled out or back based on traffic, or selected based on historic usage information (specific to that application, other applications, or the provider network as a whole) indicating where usage is expected to be heaviest (e.g., at a particular day and/or time of day).

Thereafter, the deployment engine 132 can send a set of commands to cause the application to be deployed to some or all of these locations. This may include calling other services of the cloud provider network 100, such as a non-illustrated deployment service, a compute service, etc., to deploy compute resources (e.g., containers, VMs, serverless functions, code, and the like) to the necessary locations. The deployment can also include, for example, placing service resources in the same or "nearby" (from a network latency standpoint) locations as the dependent services, configuring routing and networking information, configuring security information, and the like.

In this example of FIG. 1, the deployment causes a set of service instances 152A-152N for an example "first" service of the service group (represented as black squares) to various deployment zone 118 locations—here, two instances to a CSP edge location 142A as shown at circle (3A), one instance to a cloud provider network-managed edge location 140A as shown at circle (3B), and one instance to each of a first AZ 114A and a second AZ 114B of a first region 112A as shown at circle (3C). Given this deployment, this service was configured with a distribution strategy 128 indicating that these instances for the service were eligible to be deployed in multiple different "types" of deployment zones—namely, within AZs 114, cloud-provider network managed edge locations 140 ("local zones"), and also in CSP edge locations 142. We also stipulate that a service resource (represented by a black triangle) was configured as being needed for this first service, and it is deployed within the first AZ 114A and the second AZ 114B of the first region 112A (it may have been the case that this resource may or may not have been unavailable to be placed in edge locations 116, for example). Additionally, in this example a "second" service of the service group (represented by a black circle) was configured to be eligible to be deployed in a single type of deployment zone—here, only in AZs 114—and thus one instance of this service is deployed to the first AZ 114A and the second AZ 114B. This could be, for example, a "backend" service (such as a matchmaking function for a game, or a recordkeeping database) that is comparatively less end user-latency sensitive and thus may be restricted to being placed in AZs, which typically have higher availability and higher resource amounts and types. Other underlying architectural configurations (e.g., routing, security, and the like) are also performed at this time until the application is ready for use.

At this point, the application can be accessed by clients (e.g., electronic devices 110, which may or may not be operated by users 108) using known endpoint-finding techniques, such as via the device(s) 110 calling an API seeking a "nearby" endpoint for the application and obtaining an Internet Protocol (IP) network address used by at least one of the deployed service instances. Thereafter, the device(s) 110 can communicate with the application using those network addresses and the application begins to function.

Over time, as the components (e.g., the service instances, service resource instances, etc.) of the application are utilized, the cloud provider network 100 generates and/or obtains metrics and/or logs, as shown by circle (5), that detail and/or summarize this usage. The metrics and/or logs can be collected by (or stored to) a monitoring service 138 and then made available to the SOADM service 102, directly provided to the SOADM service 102, stored to a storage location (e.g., an object storage location, database, etc.) and then accessed by the SOADM service 102, etc. A deployment monitor 134 of the SOADM service 102 can use this information to determine if and when to modify the deployment of the application based on the user-configured configuration data 120 (e.g., the distribution strategy 128 and/or deployment configuration 130).

For example, client information (e.g., source IP network addresses, geocoordinates, source network identifiers, numbers of requests, etc.) associated with clients of the application can be obtained and analyzed to identify where the users of the application are located and to what extent the geographical distribution of use is varying. For example, at a first point in time, based on recent metrics/logs, the deployment monitor 134 may determine that a threshold number of clients (e.g., greater than 90% of clients) exists within a defined geographic area (e.g., the eastern half of the United States) and thus the application should be most heavily (or completely) deployed in locations within that geographic area. At a second point in time, deployment monitor 134 may obtain updated metric and/or log information indicating that over a recent period of time the usage is more distributed—e.g., 40% is from the western United States, 40% is from the eastern United States, and 20% is located in Europe. With this information, together with the user-configured configuration data 120, the deployment monitor 134 may determine that a current deployment (e.g., only in the eastern United States) is insufficient and that a more optimal deployment would include fewer resources in the eastern United States and more resources in the western United States and more resources in Europe. For example, similar to the initial placement process described earlier herein, the SOADM service 102 may generate an "optimal" placement for the services of the service group and determine if this placement differs from the current placement (or differs substantially from the current placement, according to some threshold(s)).

When the optimal placement differs (or differs substantially enough that the redistribution is worthwhile as the benefits outweigh the costs of doing that work), at circle (7), the deployment monitor 134 can cause the deployment engine 132 to redistribute the application accordingly, e.g., by adding additional service instances (and possibly service resource instances) to one or more new deployment zones, and possibly terminating existing service instances (and possibly service resource instances) in existing deployment zones. In this example, the deployment engine 132 may cause an additional service instance for the first service of the application to be deployed to cloud provider network-managed edge location 140N and a service resource instance (that the first service depends on) to be deployed to an AZ 114M of the associated region 112N (that "parents" that edge location 140N) as shown at circle (8). As indicated above, this redeployment may also include shutting down (or terminating, deleting, etc.) resources for an application, such as when new resources (e.g., new service instances) are to be added to a new deployment zone but doing so would cause the total number of resources (e.g., instances) to exceed a user-configured maximum—thus, when additional resources are deployed, some corresponding existing resources can be removed to prevent the maximum from being exceeded.

Figure 6:
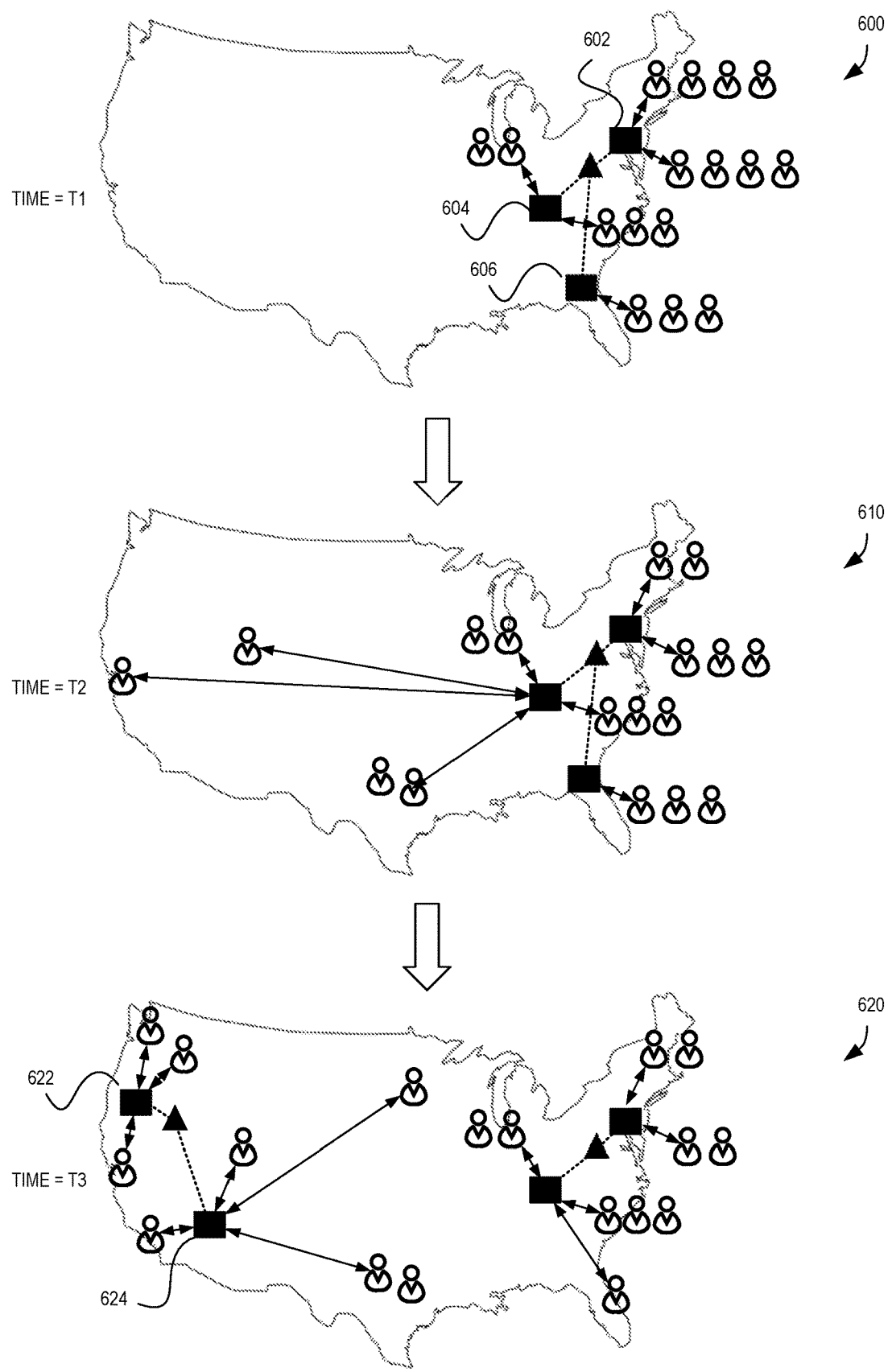
FIG. 6 illustrates user-configured dynamic service and service resource redistribution according to changing end user locations and latencies by a SOADM service according to some embodiments.

For further detail, FIG. 6 illustrates user-configured dynamic service and service resource redistribution according to changing end user locations and latencies by a SOADM service according to some embodiments. As shown at 600, at a first time (time=T1) a large number of clients are detected (e.g., via metrics/logs as described herein) to be located in various locations across the eastern half of the United States. In this case, a number of instances for a "square" service of an application may be deployed to a number of different deployment zones that are "nearby" groupings of these users—e.g., one service instance 602 in the northeast to be "close" (latency-wise) to a large number of users, another service instance 606 in the southeast to be close to another significant number of users, and a service instance 604 between the two to be close to other users. Additionally, a "triangle" service resource instance that the square service depends on may be deployed close geographically (and close in terms of latency/routing) to these instances.

At a later point in time shown at 610 (time=T2), a more significant number of users/clients may begin to appear in other locations that are more far away from the deployed resources. At this point, these clients may connect to existing resources (e.g., instances 602/604/606) but their latencies may be significantly higher than those observed by clients to the east.

At some point—such as when a threshold of number of clients are determined (e.g., based on the metrics/logs) to exist in different geographic areas, and/or latencies of some number of users exceed a threshold, etc.—the deployment monitor 134 may determine to redistribute the application. For example, at time=T3 (as referenced by 620), the SOADM service 102 may have redistributed the application by placing a new service instance 622 in the northwest (along with another service resource instance) and a new service instance 624 in the southwest. In this case, a service instance 606 has been removed, which may have occurred based on a maximum limit of service instances (e.g., the user specified only four "square" instances may exist) or based on the SOADM service 102 determining that less than a threshold number of users exist in the southeast that would warrant a more "local" deployment.

Figure 7:
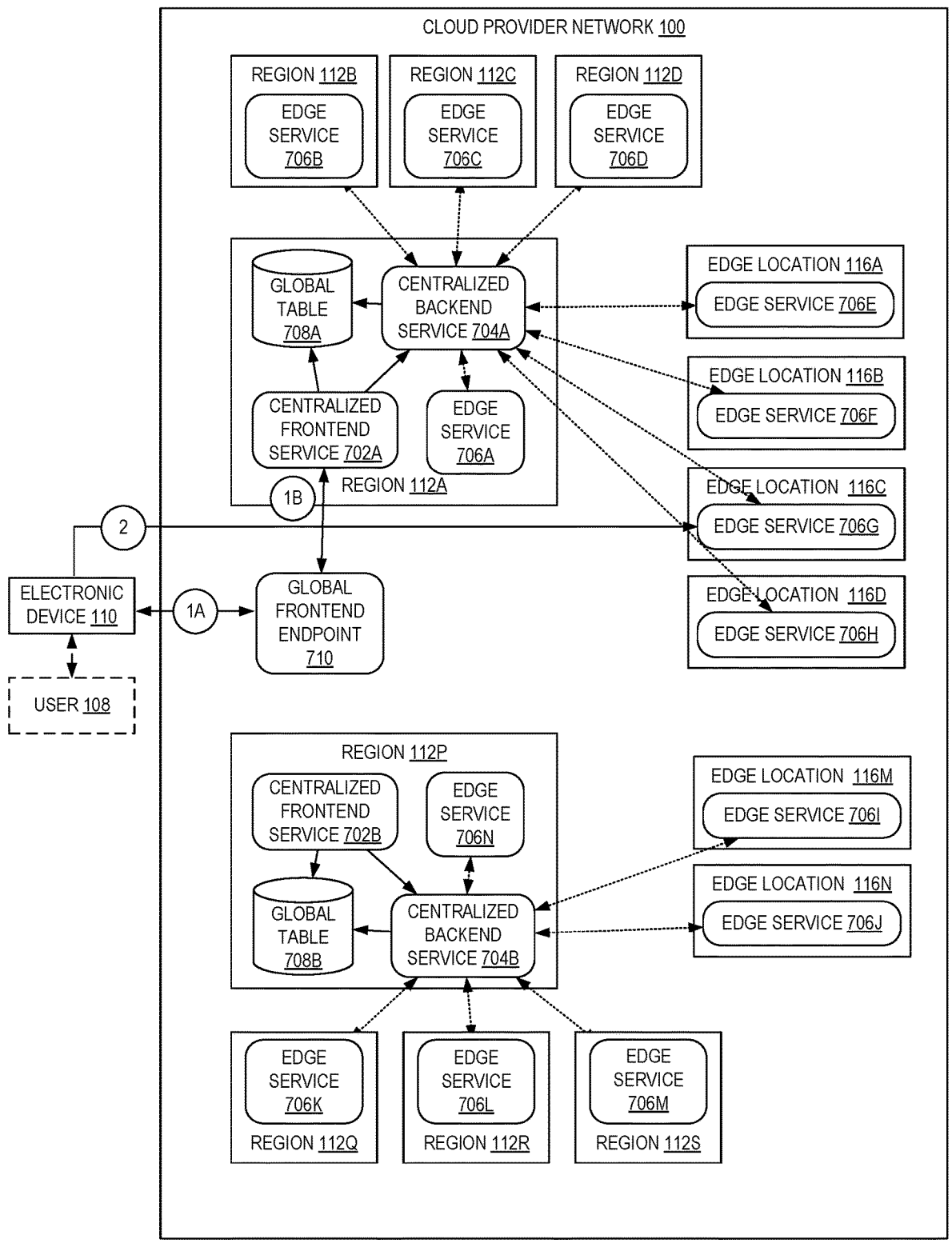
FIG. 7 illustrates an exemplary multi-service application with heterogeneous distribution strategies as deployed and distributed by a SOADM service according to some embodiments.

For further understanding, a more specific multi-service example is shown in FIG. 7, which illustrates an exemplary multi-service application with heterogeneous distribution strategies as deployed and distributed by a SOADM service according to some embodiments.

As a more specific example, consider the high-level architecture for a sample distributed gaming application that offers online multiplayer games. The core use cases for this application are to (1) authenticate players, (2) perform matchmaking to group players to participate in the same game session, (3) select a game server that will offer equivalent latency for all players in a game session, (4) run the game on the selected game server (which involves latency-sensitive operations like a physics engine that models interactions between the players and the game environment and distributes those updates to every player in the game session), (5) enable players in the game session to talk to each other over voice, (6) track various game session specific statistics, and (7) log player statistics for long term storage and analytics.

For this example, these use cases can be categorized into ones that are latency sensitive and ones that are not. Let's assume that use cases (4)-(6) are latency sensitive while (1)-(3) and (7) are not. From a system design perspective, this would generally mean that the former set of use cases need to be run in locations that are proximal to end clients and the latter set can be run in more "centralized" locations. Thus, these categories of functionality can be thought of as "edge services" and "centralized services" respectively. The centralized services may further be decomposed into a frontend service that accepts requests from end clients and backend services that are responsible for coordinating with edge services.

Thus, this user may want to target the United States and Europe using deployment zone types including AZs, local zones, and wavelength zones. In this illustrated example, the user may have set up "hub" regions for their centralized services (e.g., "us-east-1" for the U.S. and "eu-west-1" for Europe) and coordinate their local edge services from there. The system may also make use of a "global table" (e.g., a synchronized distributed database table) as a means to share data across regions. In this example, an end client (e.g., based in the state of Florida within the United States) connecting to the user's service through an accelerator endpoint that routes to the closest frontend service (e.g., centralized frontend service 702A) and then connecting to an edge service endpoint in an edge location (e.g., a wavelength zone or local zone) in the city of Miami, which is within Florida.

More generally, in this figure, a user may have deployed a three service, one service resource, application to a number of deployment zones that are in various regions and also in multiple edge locations of a cloud provider network 100. For example, an application (e.g., a chat application, a multi-player video game, etc.) may have a main service that handles most near-real time interactions with clients—this service (called an "edge service" 706A-706N herein) may benefit from being deployed to both edge locations 116A-116N (of a same type or multiple types) as well as into various regions 112A-112S). This application may also require another few services—e.g., a logically centralized frontend service 702 (deployed in two regions 112A and 112P as services 702A-702B) and a logically centralized backend service (also deployed in two regions 112A and 112P as services 704A-704B). In this example, both the centralized frontend service 702 and backend service 704 are dependent upon a service resource—here, a global data table 708 (also deployed in two regions 112A and 112P as global table instances 708A-708B) that provides data storage and retrieval functionalities. With this setup, a client (e.g., a software application executed by electronic device 110 and optionally used by a user 108) may seek to interact with the application by issuing a call at circle (1A) to a global frontend endpoint 710 (e.g., a routing accelerator entity such as AWS Global Accelerator(TM)) that may route the client at circle (1B) to an instance of the centralized frontend service 702, which may return to the client a network address associated with a particular edge service instance that is "close" to the client (e.g., in terms of network latency, number of network hops, geographic distance, etc.). Here, the electronic device 110 will thus be connected to a nearby edge service instance 706G as shown by circle (2).

For software applications and systems developed using service-oriented application architectures, several challenges exist for enabling efficient and user-friendly service discovery and application-layer routing of communications among an application's services. In this context, service discovery and application-layer routing refer broadly to the ability for the various services of a service-oriented application to locate one another (and to locate associated services resources) on a network and to establish communications as needed. For example, an application might include a first frontend service A that communicates with a second backend service B as part of its operation, while the service B might further depend upon and communicate with services C and D, and so forth, where each of these services can be deployed across any number of distinct deployment zones. As described herein, each of these services further can have one or more service resource dependencies, where these resources similarly can be created and exist at any number of distinct deployment zones at any given time depending on deployment configurations specified by a user.

Complicating matters even further, in many cases the various services of an application might be associated with separate development teams and these separate development teams might segment the services across different accounts of a cloud provider network 100 or create other isolation boundaries around the services as part of the development process. As a result, creating networks that span a collection of application services such that the services can easily discover and communicate with one another can be challenging. One way to help with service discovery and communications for such applications is to provide each service with a public IP address that can be used by the services to connect to one another. However, application developers often prefer for at least some of their services to inaccessible to client devices on the public internet for security and other implementation reasons. Furthermore, it is convenient for developers to implement their applications such that the services can be referred to by name instead of an IP address (e.g., using a domain name that can be resolved by a Domain Name System (DNS) resolver, or other type of identifier that can be resolved using a service registry or other mechanism). Application developers further desire to enable such interservice communications to be established without needing to modify their code at different stages of the development pipeline (e.g., using the same service code whether it is on a developer desktop, in gamma testing, in production, etc.). Still further, it is typically desirable for each service to be able to discover dependent services or resources that are deployed in a deployment zone that is "closest" (e.g., in terms of network latency or hops) to the deployment zone of the requesting service.

The aforementioned challenges, among others, are addressed by service discovery and application-level networking features implemented in the context of a SOADM service 102. In some embodiments, these features provide latency-focused routing in part by using data reflecting latency estimates between deployment zones of a cloud provider network. For example, if a service A executing in a deployment zone located near Paris, France is looking for a "closest" instance of a backend service B deployed in both a first deployment zone located near Dublin, Ireland and second deployment zone located near N. Virginia, the service can use deployment zone-to-deployment zone latency data to identify the instance of the backend service in the first deployment zone as being associated with a lowest estimated latency and can thus direct traffic from the serviceA to the service B accordingly. Furthermore, the SOADM service 102 can provide such latency-based service discovery and application-level networking features based on any of DNS-based domain names assigned to application services, API-based service and resource discovery requests implemented using a service registry or similar mechanism, or various combinations thereof, enabling users to readily integrate such features into their service-oriented applications managed by a SOADM service 102.

Figure 8:
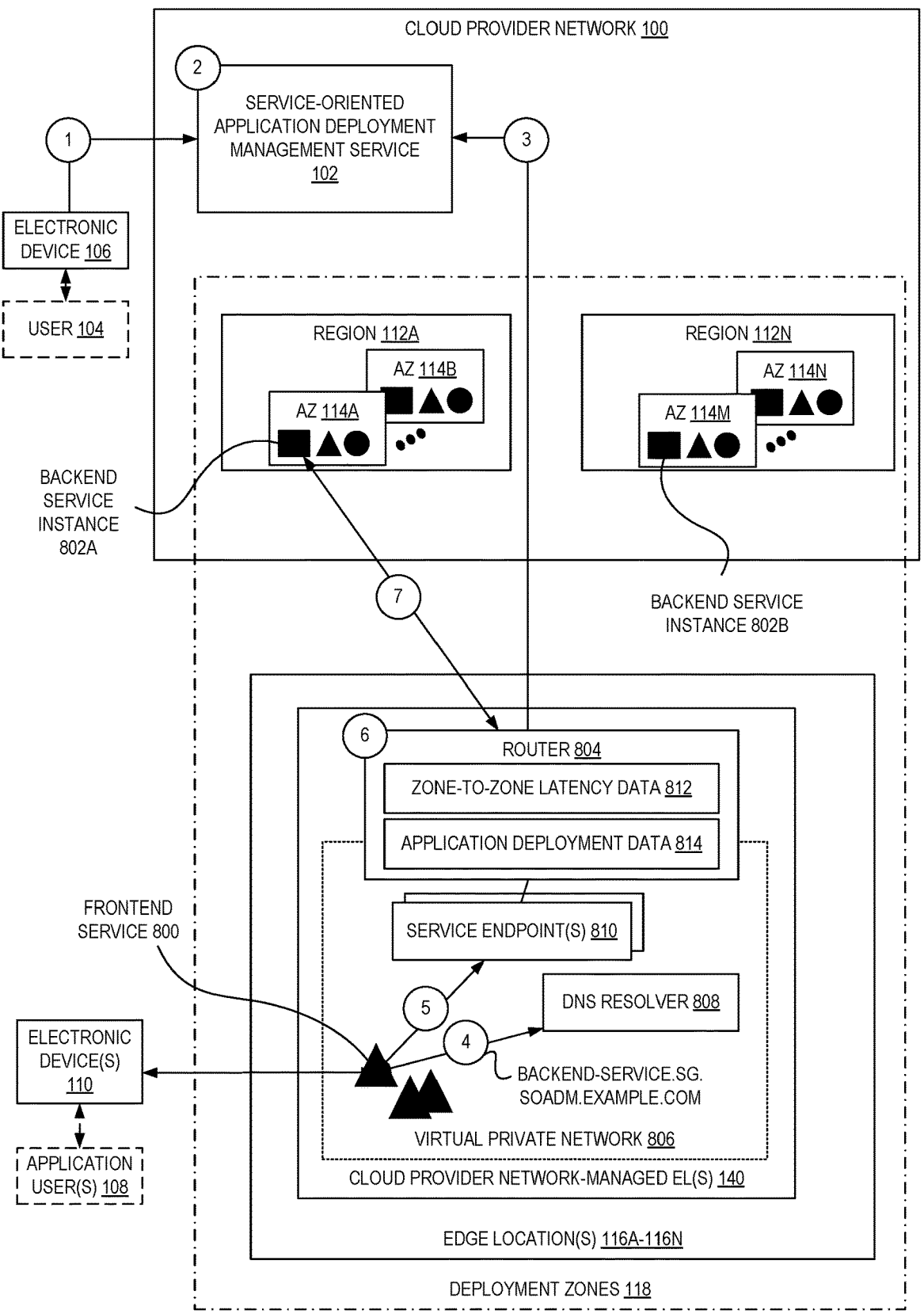
FIG. 8 illustrates a Domain Name System (DNS) based service discovery and latency-based routing system provided by a SOADM service according to some embodiments.

FIG. 8 illustrates a DNS-based service discovery and latency-based routing system provided by a SOADM service 102 according to some embodiments. The numbered circles (1)-(7), for example, illustrate an exemplary process in which a user provides, to a SOADM service 102, configuration data defining an application and associated characteristics of the application's desired deployment behavior. Once deployed by the SOADM service 102, the illustrated process further includes a first service of the application (e.g., a frontend service 800) sending a request identifying a second service of the application (e.g., a backend service, where multiple instances of the backend service have been deployed including a backend service instance 802A and backend service instance 802B) as part of the service's operation. As described in more detail hereinafter, responsive to such a request, a router 804 identifies an instance of the second service associated with a lowest network latency estimate relative to the first service, where instances of the second service may be instantiated at any number of different deployment zones associated with varying latency estimates relative to the first service. The router 804 then routes the request from the first service to the identified instance of the second service 802A, where the request is routed without traversing the public internet (e.g., routed using networks internal to the cloud provider network 100).

As indicated herein, the SOADM service 102, in some embodiments, provides a global deployment experience that enables users to specify certain aspects of an application's deployment behavior such as rollout cadence, validation steps, auto-rollback configurations, and the like, and then manages the underlying sequencing of deployment locations and low-level deployment activities. The SOADM service 102 further manages the deployment and configuration of infrastructure used to support application deployments such as virtual private networks, load balancers, service endpoints, routers, etc., at deployment zones, among other management operations.

In some embodiments, at circle (1) in FIG. 8, a user 104 (e.g., a software application developer) uses an electronic device 106 to interact with the SOADM service 102 to provide configuration data for an application that the user desires to deploy within a cloud provider network 100 and optionally within associated edge locations (e.g., including edge locations 116A-116N). In some embodiments, the configuration data defines a service group for an application, which includes one or more service configurations, zero or more service resource configurations, one or more distribution strategies, one or more deployment configurations, and potentially other types of configuration data.

In some embodiments, as part of configuring an application with a SOADM service 102, a user can specify that one or more of services and resources of an application are to be "private" services or resources (e.g., specified as a "visibility" flag associated with a service or resource), where a private service or resource is one to be made accessible only to other services and resources of the same application or service group (or more generally to other services or applications with access to a private identifier of the service or resource). To enable application services to easily refer to and access other services designated as private, the SOADM service 102 can associate some or all the services and resources of the application with user-friendly domain names or other identifiers that can be used as part of the service and resource discovery and routing processes described herein. For example, a backend service of an application might be identified by the domain name "backend-service.my-servicegroup.soadm.example.com" or any other similar type of identifier. These service and resource identifiers can be automatically generated by the SOADM service 102 or optionally configured by a user 104, e.g., as part of the service group configuration. Similarly, application resources can also be assigned user-friendly identifiers expressed using either a domain name format or other type of Uniform Resource Identifier (URI). These user-friendly identifiers, for example, can be used in the code of the application in consistent manner across deployments of the application and without using hardcoded addresses for the various services and resources.

Once configured, a user can instruct the SOADM service 102 to run (or deploy) an application by sending a request or command to run the application. In response, at circle (2) in FIG. 8, a deployment engine or other component of the SOADM service 102 obtains the configuration data and further optionally obtains capacity information from a capacity service identifying different deployment zones, available capacity therein (e.g., container or VM "slots" available for usage at each deployment zone), performance and/or availability and/or network information about those deployment zones, and the like, and determines an initial set of locations to deploy the service(s) and resources associated with the service group to that is adherent to the information provided in the configuration data. Thereafter, the SOADM service 102 sends commands to cause the application to be deployed to the selected locations, as described elsewhere herein.

In this example of FIG. 8, the deployment at circle (2) causes a set of service instances for an example "first" service of the service group (represented as black squares) to various deployment zones, cloud provider network-managed edge locations, and the like. In the illustrated example, a backend service is deployed to at least each of a region 112A and a region 112N (where various other services and resources of the application might also be deployed to the same or different regions). Similarly, a frontend service 800 is deployed to one or more edge location 116A-116N. Other underlying architectural configurations (e.g., creation and configuration of a virtual private network 806, DNS resolver 808, service endpoint(s) 810, router 804, and the like) can also be performed at this time. Once deployed, the application can be accessed by clients.

In some embodiments, as part of the architectural configurations, the SOADM service 102 further configures at circle (3), within a hosted virtual private network 806, DNS records to be used by a DNS resolver 808 to map domain names or other identifiers assigned to various services or resources to canonical domain names or other identifiers (e.g., globally unique identifiers of the services or resources within the cloud provider network 100) used by a service endpoint 810 and router 804 to route the requests accordingly. The configuration at circle (3) optionally further includes the configuration of zone-to-zone latency data 812 and application deployment data 814 (e.g., data indicating deployment zones at which various services and resource of the application have been deployed) at the router 804. This latency data 812, for example, can be generated or otherwise obtained by the SOADM service 102 based on network latency measurements observed between clients in respective deployment zones. The latency data 812 can be updated periodically, e.g., based on a recurring schedule, responsive to the addition or removal of deployment zones, or based on other conditions. Furthermore, in some embodiments, the application deployment data 814 can be updated at the router 804 by the SOADM service 102 as deployment of an application changes over time, e.g., as services and resources are deployed to new deployment zones, removed from existing deployment zones, or combinations thereof.

As shown in FIG. 8, a VPC 806 has one or more separate service endpoint(s) 810 used to route application service traffic, where each service endpoint can be used to route traffic for one or more other services of the application. As described above, a service group can be associated with a DNS-type identifier, e.g., service-group-name.soadm.example.com, where the service group name is globally unique to the associated user. Furthermore, each service of an application can be assigned a respective subdomain of the service group domain (e.g., service-name.service-group-.soadm.example.com). These DNS names created for each of the services can then be resolved by a DNS resolver 808 to a service endpoint in the virtual private network, where the service endpoint forwards the traffic to a router 804. The router 804 then uses the zone-to-zone latency data 812 and application deployment data 814 to identify an instance of a requested service located in a deployment zone having a lowest estimated latency relative to the requesting service.

For example, at circle (4), at some point in time, an instance of a frontend service 800 sends a request identifying a backend service, where the request can be a request to establish a data connection, an API request, etc. In some embodiments, the request includes a domain name (e.g., "backend-service.my-servicegroup.soadm.example.com") that is directed to the DNS resolver 808. In this example, the DNS resolver 808 includes a record that maps the application-specific domain name to another domain name (e.g., a canonical domain name) to be used to direct, at circle (5), the request to a specialized service endpoint (e.g., a service endpoint 810) and router 804 for latency-based routing within the cloud provider network 100. In some embodiments, the canonical domain name, original service-identifying domain name, or both are included in a header of the request to enable the router 804 to identify a particular service or resource being requested.

In some embodiments, at circle (6), the router 804 uses the deployment zone-to-deployment zone latency data 812 to identify an instance of the backend service associated with a lowest network latency estimate relative to the frontend service 800. In some embodiments, the router 804 uses the application deployment data 814 indicating deployment zones at which the backend service is currently deployed in combination with the deployment zone-to-deployment zone latency data 812 to identify an instance of the service with a lowest latency estimate. The router 804, for example, can identify a deployment zone associated with the requesting service based on data contained in the request, information about the service endpoint from which the request was forwarded, information about the location of the router 804, or any combination thereof, and use the pair-wise latency estimates to identify a deployment zone associated with a lowest latency estimate. In the example of FIG. 8, the backend service instance 802A is identified as having the lowest latency estimate.

In some embodiments, at circle (7), once identified, the router 804 routes the request from the frontend service 800 to the instance of the backend service 802A located in the deployment zone (e.g., region 112A) associated with a lowest latency relative to the deployment zone in which the requesting service is located (e.g., one of edge locations 116A-116N). As indicated above, in some embodiments, the request is routed via networks internal the cloud provider network 100 and without traversing the public internet, thereby improving the latency and security with which the traffic is communicated.

Figure 9:
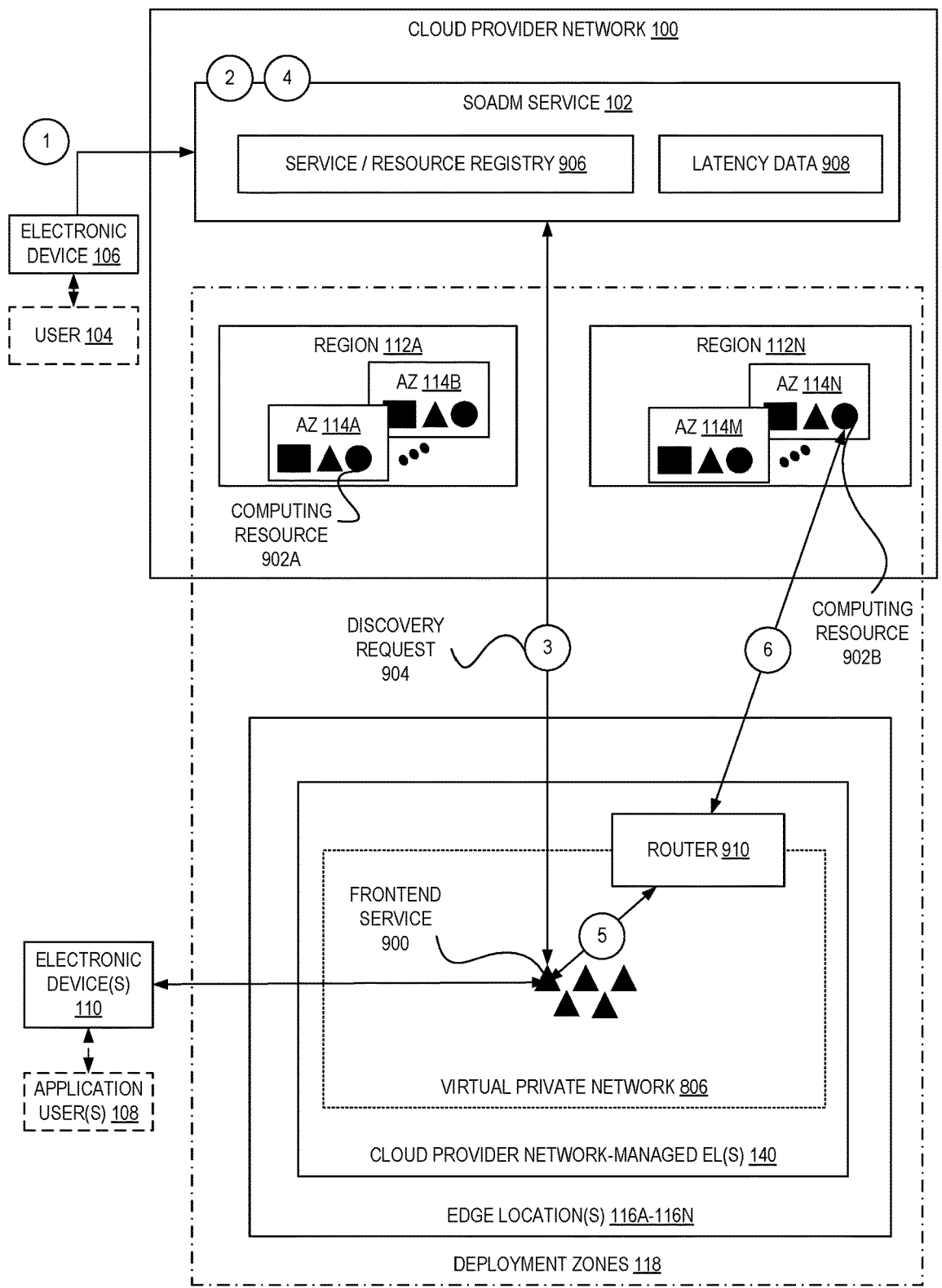
FIG. 9 illustrates an application programming interface (API) based service discovery and latency-based routing system provided by a SOADM service according to some embodiments.

FIG. 9 illustrates an application programming interface (API) based service discovery and latency-based routing system provided by a service-oriented application deployment management service according to some embodiments. The numbered circles (1)-(6) in FIG. 9 illustrate an exemplary process in which a first service 900 deployed in a first deployment zone discovers an instance of a computing resource deployed in a second deployment zone using a discovery request 904 sent to the SOADM service 102. As described in more detail, the SOADM service 102 maintains a service and resource registry 906 and zone-to-zone latency data 908 used to identify instances of a service or resource associated with a lowest latency relative to a requesting service. Although the example illustrated in FIG. 9 includes a service discovering and accessing an instance of a resource dependency, a similar process involving a discovery request can be used to discover an instance of another service.

Similar to FIG. 8, at circle (1) in FIG. 9, a user provides user-specified configuration data defining a service group for an application, where the configuration data includes service definitions corresponding to the services of the application. As described elsewhere herein, each of these service definitions can be associated with, for example, a distribution strategy definition indicating a set of deployment zone types into which the associated service can be deployed, among other configurations. At circle (2), the SOADM service 102 causes the application to be deployed to a plurality of deployment zone locations of the cloud provider network 100 based on the configuration data. In the example of FIG. 9, a frontend service 900 is deployed to one or more edge location 116A-116N and instances of a computing resource (e.g., computing resource 902A and computing resource 902B) are deployed to each of a region 112A and a region 112N.

In some embodiments, at circle (3), a frontend service 900 intending to access an instance of the deployed computing resource sends a discovery request 904 to the SOADM service 102. The discovery request 904, for example, can be specified as an API request (e.g., a "discoverResource" API or "discoverService" API) supported by the SOADM service 102, and can include an identifier of the service or resource (e.g., using a domain name, resource identifier, or other identifier) being requested. In some embodiments, the identifier of the service or resource can include an identifier of the service group to which the service or resource belongs. As indicated above, these identifiers of the services and resources can be generated by the SOADM service 102, the provider network 100, or customized by a user in some examples. In some embodiments, the request can further include information indicating a deployment zone in which the requesting service 900 is located, e.g., where the deployment zone identifying information can be specified explicitly as part of the request or otherwise derived from information contained in the request.

In some embodiments, responsive to the discovery request 904, at circle (4), the SOADM service 102 identifies an instance of the requested service or resource associated with a lowest latency estimate relative to the requesting frontend service 900 using a service and resource registry 906 and latency data 908. A service registry, for example, is a database of an application's services and resources and information about deployment zones at which the services and resources are deployed at any given time. For example, service and resources instances can be registered by the SOADM service 102 with the service and resource registry 906 when services or resources are launched and deregistered when services or resources are terminated. Application services can then query the service and resource registry 906 to find the available instances of a service. In some embodiments, the service and resource registry 906 invokes a service instance's health check API to verify that it is able to handle requests.

As indicated above, the SOADM service 102 identifies an instance of a service or resource in part by using latency data 908 indicating deployment zone-to-deployment zone latency estimates. Thus, given an identifier of the deployment zone of the requesting service, an identifier of the requested service or resource, identifiers of deployment zones at which the requested service or resource is currently deployed, the service and resource registry 906 can determine a deployment zone at which the requested service or resource is currently deployed with a lowest latency estimate relative to the requesting service. In some embodiments, the SOADM service 102 returns an identifier of the identified service or resource that can be used to route requests from the frontend service 900 to the appropriate instance of the requested service or resource. The identifier, for example, can include a private identifier (e.g., a service or resource network address or other identifier generated by the provider network 100) that is not discoverable on the internet and is used to route traffic internally within the provider network 100.

In some embodiments, using the domain name or other service or resource identifier returned by the SOADM service 102, at circle (5), the frontend service 508 sends a request to communicate with or otherwise access the service or resource to the router 910. For example, the request can be a request to open a data connection, or an API request to access a service or resource, etc., and include the service or resource identifier returned by the SOADM service 102. In some embodiments, at circle "6," the router 902B then directs the request to the identified instance of the service or resource with the lowest latency relative to the requesting frontend service 900.

As described herein, a user may define an application by providing configuration data 120 to define a single- or multi-service service group 122 for an application to enable the SOADM service 102 to intelligently deploy and dynamically redistribute the application components—potentially across many different deployment zones of potentially different deployment zone types—according to the user's preferences. One example set of interfaces, e.g., application programming interface (API) calls, are shown in subsequent figures to illustrate one possible configuration.

FIG. 10 is a diagram illustrating an exemplary create service group request 1000 and response 1020 according to some embodiments. The create service group request 1000 may be sent to initially create a service group—or, a logical grouping of related services forming an application—by providing a name for the service group and optionally a set of "cloud private network" (e.g., a virtual network of the user's within the context of the provider network, such as a Virtual Private Cloud (VPC) offered by AWS (TM)) network address blocks (e.g., Classless Inter-Domain Routing (CIDR) blocks) for the application, and optionally a client token (that can be returned for idempotency reasons). The network address blocks may thus be used, by the SOADM service 102, to configure networking for the application. As this network has the potential to span many locations and contain many resources, all of which must be able to talk with one another, the larger the address space the more room the network has to grow over time and accommodate new resource types and new locations. By default, the SOADM service 102 may select a single contiguous range (e.g., 10.0.0.0/14), though the user may specify one as well. As the SOADM service 102 deploys services to new locations it may pull addresses from this range to create and expand cloud provide network address space as needed. In some embodiments, the SOADM service 102 creates one VPN (e.g., a private network for a user managed at least partially by the cloud provider network) per region for services within a service group and assigns one or more VPN CIDRs based on the services contained within the service group and their scaling properties.

The response 1020 may confirm the name, CPN CIDRs, the token (not shown), and optionally the DNS base name for the service group (as discussed elsewhere herein).

FIG. 11 is a diagram illustrating an exemplary create service configuration request according to some embodiments. After creating a service group, the user may create a service configuration by issuing this call 1100, providing a name 1110 for the service configuration, an identifier 1120 of the service group to which it belongs, and an identifier 1130 of a distribution strategy that governs how this service is distributed (to be discussed below in further detail). The call 1100 also includes a service template that specifies how to configure the service, e.g., in terms of a service configuration 1140 specifying instance types and numbers thereof to use (here, using two instances having 4 cores and 16 units of memory), what code to use (here, a location of a container image to use), a load balancer configuration for a load balancer to be deployed in front of the two instances, etc. Optionally, the call 1100 also provides a name for the service itself, a set of identifiers 1150 of services and/or service resources that it depends upon, and optionally a client idempotency token.

Similarly, FIG. 12 is a diagram illustrating an exemplary create service resource configuration request 1200 and an exemplary create distribution strategy request 1250 according to some embodiments.

In this example, the create service resource configuration request 1200 may specify a name 1210, an identifier 1220 of the service group to which it is associated, and an identifier 1230 of the type of the resource—e.g., a database table, a file or object, a serverless function (e.g., executed by a serverless code execution service of the provider network), a snapshot or image, a monitoring service alarm, etc. The request 1200 may optionally include an identifier of a deployment template file indicating how to deploy the resource, a service resource identifier that can be used to obtain the resource itself, a name for the service resource (e.g., that is unique within the service group), and an idempotency token.

The create distribution strategy request 1250 can be used to allow the creation of a distribution strategy and may include a name 1255 for the distribution strategy, an identifier 1260 of the service group that it is associated with, and identifiers 1265 of a set of one or more deployment zone types that a service, associated with this distribution strategy, may be deployed to. In this example, the user has indicated that the service may be deployed into AZs, local zones, as well as wavelength zones. Optionally, the create distribution strategy request 1250 may include an identifier 1270 of a maximum number of locations that the service may be deployed within at any one point in time and can provide a distribution group configuration 1275 specifying distribution groups for the service to be deployed into along with weighting that determines how the global capacity pool will be distributed between each distribution group. In this example, the user has provided a set of distribution groups that can be used for deployment—here, "us-east" and "us-west-2" and "eu-west" and "eu-central-1"—and thus the application can be deployed to AZs, local zones, and wavelength zones within (or parented by) only regions included within these distribution groups, but not into deployment zones in (or parented by) other regions that are not included within these distribution groups. Further, in this example, the user has indicated that service-managed weighting (of resources across these distribution groups) is to be disabled, and instead provides weights indicating relative proportions of instances that should (approximately) be placed across the distribution groups—thus, there may typically be around five times as many resources in the "us-east" distribution group as are present in the "eu-central-1" distribution group. In the alternative, users may indicate that the SOADM service 102 is to manage the weighting, and thus the SOADM service 102 may place service instances according to where the end client traffic is coming from—e.g., more instances near more of the traffic.

In this manner, users are given wide control over where, specifically, their services are deployed and may even have different distribution strategies for different services of an application, e.g., to keep them in particular types of deployment zones, to keep them in (or keep them out of) particular locations of the world, etc. The create distribution strategy request 1250 may also include a size definition 1280 indicating a global minimum number of service instances and a global maximum number of compute capacity (e.g., VMs, containers, etc.)—here, 250 and 500, respectively, and thus the SOADM service 102 may scale the service up or down within that proscribed range. Finally, the create distribution strategy request 1250 may optionally include an idempotency token.

Two examples of distribution strategies for different types of services of a gaming application are shown in FIG. 13, which is a diagram illustrating examples for configuring a distribution strategy for a centralized service and also for an edge service according to some embodiments. In this example, instead of using distribution groups, the call is modified to allow users to specify specific regions of interest. Thus, the create distribution strategy request 1300 for creating a "centralized service" indicates that the corresponding service may only be placed within AZs located in the "us-east-1" or "eu-west-1" regions, whereas the request 1350 for creating an "edge service" indicates that the corresponding service may be placed in AZs, and/or local zones, and/or wavelength zones, in up to fifty different locations, within eight specific regions.

FIG. 14 is a diagram illustrating an exemplary create global deployment configuration request 1400 and an exemplary run service request 1450 according to some embodiments. The create global deployment configuration request

1400 may include a name for the deployment configuration and a name of the associated service group.

Optionally, the create global deployment configuration request 1400 can include a deployment-unit-strategy-name. A deployment unit strategy controls the rate at which newly-deployed code is exposed to production traffic, and strategies may be provided by the SOADM service 102 or user-defined. A variety of deployment unit strategies can be used, such as (but not limited to):

LINEAR_10_PERCENT_EVERY_1_MINUTE—Shifts 10 percent of traffic every minute until all traffic is shifted.

LINEAR_10_PERCENT_EVERY_3_MINUTES— Shifts 10 percent of traffic every 3 minutes until all traffic is shifted.

CANARY_10_PERCENT_5_MINUTES—Shifts 10 percent of traffic in the first increment. The remaining 90 percent is deployed 5 minutes later.

CANARY_10_PERCENT_15_MINUTES—Shifts 10 percent of traffic in the first increment. The remaining 90 percent is deployed 15 minutes later.

ALL_AT_ONCE—Shifts all traffic as soon as the deployment succeeds.

In some embodiments, if no value is provided for this property, a default value can be used, such as LINEAR_10_PERCENT_EVERY_1_MINUTE.

Optionally, the create global deployment configuration request 1400 can also include a minimum number of healthy locations percentage, which assesses the health of locations which have been deployed to with the new version of a service. When the number of healthy locations falls beneath the threshold, the deployment will be automatically stopped. (In some embodiments, a no-min-healthy-locations-percent parameter can be passed as a Boolean flag to explicitly set the min-healthy-locations-percent to zero.) If an auto rollback configuration is supplied as "enabled" then a subsequent auto rollback of the service across all locations will begin. Optionally, the create global deployment configuration request 1400 can also include an idempotency token.

The run service request 1450 can be used by the user to deploy their application and may be as simple as providing a service configuration name associated with the desired application. Optionally, a version identifier of the service configuration may be passed (to indicate which version is to be deployed, with a default value being the latest). Names and versions of service deployment configurations and/or distribution strategies may also be provided, as well as an idempotency token.

Figure 15:
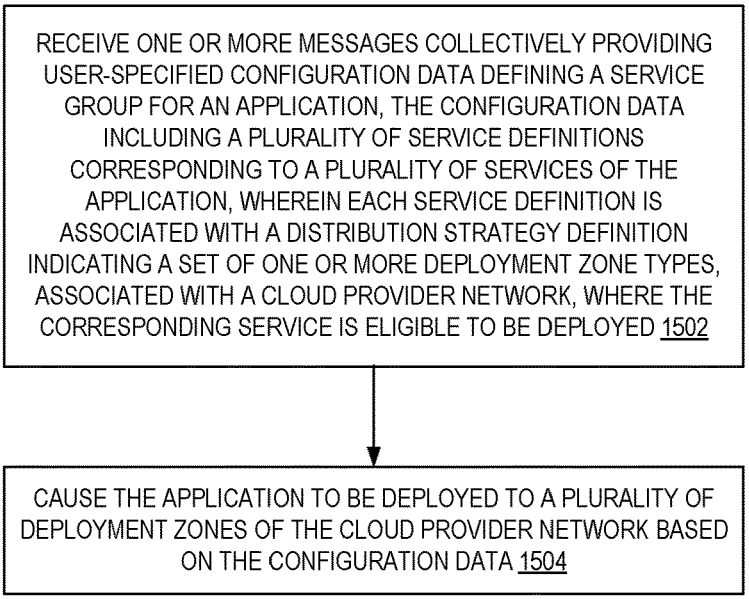
FIG. 15 is a flow diagram illustrating operations of a method for user-configurable multi-service application deployment and distribution across multiple types and locations of deployment zones according to some embodiments.

FIG. 15 is a flow diagram illustrating operations 1500 of a method for user-configurable multi-service application deployment and distribution across multiple types and locations of deployment zones according to some embodiments. Some or all of the operations 1500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 1500 are performed by the SOADM service 102 of the other figures.

The operations 1500 include, at block 1502, receiving one or more messages collectively providing user-specified configuration data defining a service group for an application, the configuration data including a plurality of service definitions corresponding to a plurality of services of the application, wherein each service definition is associated with a distribution strategy definition indicating a set of one or more deployment zone types, associated with a cloud provider network, where the corresponding service is eligible to be deployed.

The operations 1500 further include, at block 1504, causing the application to be deployed to a plurality of deployment zones of the cloud provider network based on the configuration data.

In some embodiments, the operations 1500 further include obtaining usage metrics associated with the application, the usage metrics identifying network addresses, locations, or latencies associated with clients that have accessed the application; determining, based at least in part on the usage metrics and the configuration data, to deploy one or more service instances for a first service of the plurality of services to a first deployment zone that is geographically separate from all of the plurality of deployment zones; and causing the one or more service instances to be deployed to the first deployment zone location. In some embodiments, the service group, as defined by the configuration data, further includes a service resource utilized by the first service; the service definition corresponding to the first service indicates that the first service is dependent upon the service resource; and the operations further comprises causing the service resource to be deployed to the first deployment zone or a second deployment zone prior to the deployment of the one or more service instances.

In some embodiments, the plurality of deployment zones are of a same deployment zone type, wherein the deployment zone type is one of: a zone within a region of the cloud provider network; a local zone deployed in a location distinct from any region of the cloud provider network; or a wavelength zone deployed within a facility of a communications service provider. In some embodiments, the plurality of deployment zones are of at least two different deployment zone types, each comprising one of: a zone within a region of the cloud provider network; a local zone deployed in a location distinct from any region of the cloud provider network; or a wavelength zone deployed within a facility of a communications service provider.

In some embodiments, a first service of the plurality of services is deployed within multiple different deployment zone types; and a second service of the plurality of services is deployed within only one deployment zone type.

In some embodiments, at least one distribution strategy definition further indicates a set of regions, of the cloud provider network, where instances of the associated service of the application may be deployed to, wherein at least one region of the set of regions includes or is associated with at least two different deployment zone types.

In some embodiments, a first distribution strategy definition, associated with the first service, further indicates a global minimum or global maximum number of instances to be deployed for the first service.

In some embodiments, the operations 1500 further include, based on the determining to deploy one or more service instances for the first service of the plurality of services to the first deployment zone, determining that the deployment of the one or more service instances would cause a total number of instances deployed for the first service to exceed the global maximum; and causing another one or more service instances for the first service within one of the plurality of deployment zones to be terminated.

In some embodiments, the configuration data further includes a deployment configuration associated with the service group, the deployment configuration indicating a rate at which the application is deployed to different deployment zones.

FIG. 16 is a flow diagram illustrating operations 1600 for providing service discovery and latency-based routing for a multi-service application deployed across any number of separate deployment zones according to some embodiments. Some or all of the operations 1600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 1600 are performed by the SOADM service 102 of the other figures.

The operations 1600 include, at block 1602, receiving, at a cloud provider network, a request from a first service of a service-oriented software application that includes a plurality of services, wherein the request identifies a second service or a computing resource of the service-oriented software application, wherein the cloud provider network includes a plurality of deployment zones, wherein the first service is deployed in a first deployment zone of the plurality of deployment zones, and wherein each of a plurality of second deployment zones includes an instance of the second service or an instance of the computing resource.

The operations 1600 further include, at block 1604, identifying, based on data indicating network latency estimates between deployment zones of the plurality of deployment zones, an instance of the second service or an instance of the computing resource associated with a lowest network latency estimate relative to the first service.

The operations 1600 further include, at block 1606, routing the request from the first service to the instance of the second service or to the instance of the computing resource associated with the lowest network latency relative to the first service, wherein the request is routed without traversing the public internet.

In some embodiments, the first service is part of a virtual private network deployed in the first deployment zone, and wherein the request identifies the second service using a domain name, and the operations 1600 further include: translating the domain name identifying the second service to an Internet Protocol (IP) address associated with an endpoint of the virtual private network, and wherein the endpoint directs the request to a router that identifies, based on the data indicating latency estimates between deployment zones of the plurality of deployment zones, the instance of the second service or the instance of the computing resource associated with the lowest network latency estimate relative to the first service.

In some embodiments, wherein the request includes an identifier of the computing resource of the service-oriented software application, and wherein the method further comprises translating the identifier of the computing resource into a unique resource identifier provided by the cloud provider network for the resource, and wherein the unique resource identifier is used to route the request.

In some embodiments, the operations 1600 further include receiving, at the cloud provider network, a request to create a service group configuration corresponding to the service-oriented application, wherein the service group configuration is associated with at least one deployment strategy used to deploy instances of the plurality of services at particular deployment zones of the plurality of deployment zones; and deploying the first service to the first deployment zone and deploying the second service to the second deployment zone according to the deployment strategy of the service group configuration.

In some embodiments, the first deployment zone is one of: a zone within a region of the cloud provider network, a local zone deployed in a location distinct from any region of the cloud provider network, or a wavelength zone deployed within facilities of a communications service provider.

In some embodiments, identifying the instance of the second service or the instance of the computing resource further includes searching a service registry indicating deployment locations of the second service or the computing resource.

In some embodiments, the first service is associated with a first account of the cloud provider network and the second service is associated with a second account of the cloud provider network.

In some embodiments, the first service implements a frontend of the service-oriented software application and is configured to receive requests from application clients, and wherein the second service implements a backend dependency of the first service.

In some embodiments, the operations 1600 further include obtaining updated network latency estimates between the plurality of deployment zones; and modifying the data indicating the network latency estimates to reflect the updated network latency estimates.

In some embodiments, the operations 1600 further include receiving input indicating that the second service is a private service, and wherein the second service is not associated with a public Internet Protocol (IP) address.

In some embodiments, the computing resource is one of: a data object stored by a data storage service, a block storage volume managed by a block-storage service, or a virtual machine image managed by a hardware virtualization service.

Figure 17:
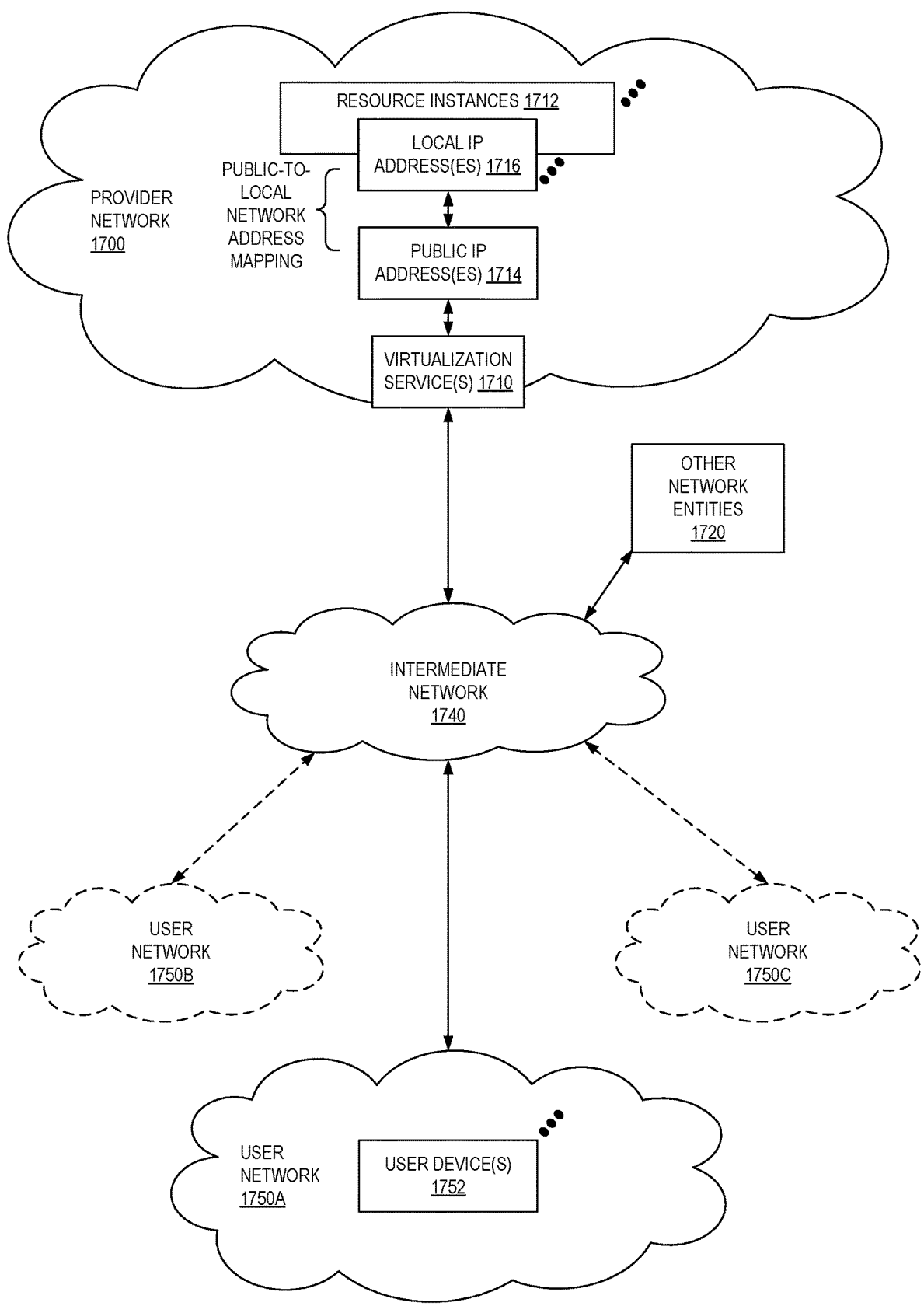
FIG. 17 illustrates an example provider network environment according to some embodiments.

FIG. 17 illustrates an example provider network (or "service provider system") environment according to some embodiments. A provider network 1700 can provide resource virtualization to users via one or more virtualization services 1710 that allow users to purchase, rent, or otherwise obtain instances 1712 of virtualized resources, including but not limited to computation and storage resources, implemented on devices within the provider network or networks in one or more data centers. Local Internet Protocol (IP) addresses 1716 can be associated with the resource instances 1712; the local IP addresses are the internal network addresses of the resource instances 1712 on the provider network 1700. In some embodiments, the provider network 1700 can also provide public IP addresses 1714 and/or public IP address ranges (e.g., Internet Protocol version 4 (IPv4) or Internet Protocol version 6 (IPv6) addresses) that users can obtain from the provider network 1700.

Conventionally, the provider network 1700, via the virtualization services 1710, can allow a user of the service provider (e.g., a customer that operates one or more customer networks 1750A-1750C (or "client networks")

including one or more user device(s) 1752) to dynamically associate at least some public IP addresses 1714 assigned or allocated to the user with particular resource instances 1712 assigned to the user. The provider network 1700 can also allow the user to remap a public IP address 1714, previously mapped to one virtualized computing resource instance 1712 allocated to the user, to another virtualized computing resource instance 1712 that is also allocated to the user. Using the virtualized computing resource instances 1712 and public IP addresses 1714 provided by the service provider, a user of the service provider such as the operator of the user network(s) 1750A-1750C can, for example, implement user-specific applications and present the user's applications on an intermediate network 1740, such as the Internet. Other network entities 1720 on the intermediate network 1740 can then generate traffic to a destination public IP address 1714 published by the user network(s) 1750A-1750C; the traffic is routed to the service provider data center, and at the data center is routed, via a network substrate, to the local IP address 1716 of the virtualized computing resource instance 1712 currently mapped to the destination public IP address 1714. Similarly, response traffic from the virtualized computing resource instance 1712 can be routed via the network substrate back onto the intermediate network 1740 to the source entity 1720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the user. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by users of the provider network 1700; a user can then assign their allocated public IP addresses to particular resource instances allocated to the user. These public IP addresses can be referred to as user public IP addresses, or simply user IP addresses. Instead of being assigned by the provider network 1700 to resource instances as in the case of standard IP addresses, user IP addresses can be assigned to resource instances by the users, for example via an API provided by the service provider. Unlike standard IP addresses, user IP addresses are allocated to user accounts and can be remapped to other resource instances by the respective users as necessary or desired. A user IP address is associated with a user's account, not a particular resource instance, and the user controls that IP address until the user chooses to release it. Unlike conventional static IP addresses, user IP addresses allow the user to mask resource instance or availability zone failures by remapping the user's public IP addresses to any resource instance associated with the user's account. The user IP addresses, for example, enable a user to engineer around problems with the user's resource instances or software by remapping user IP addresses to replacement resource instances.

Figure 18:
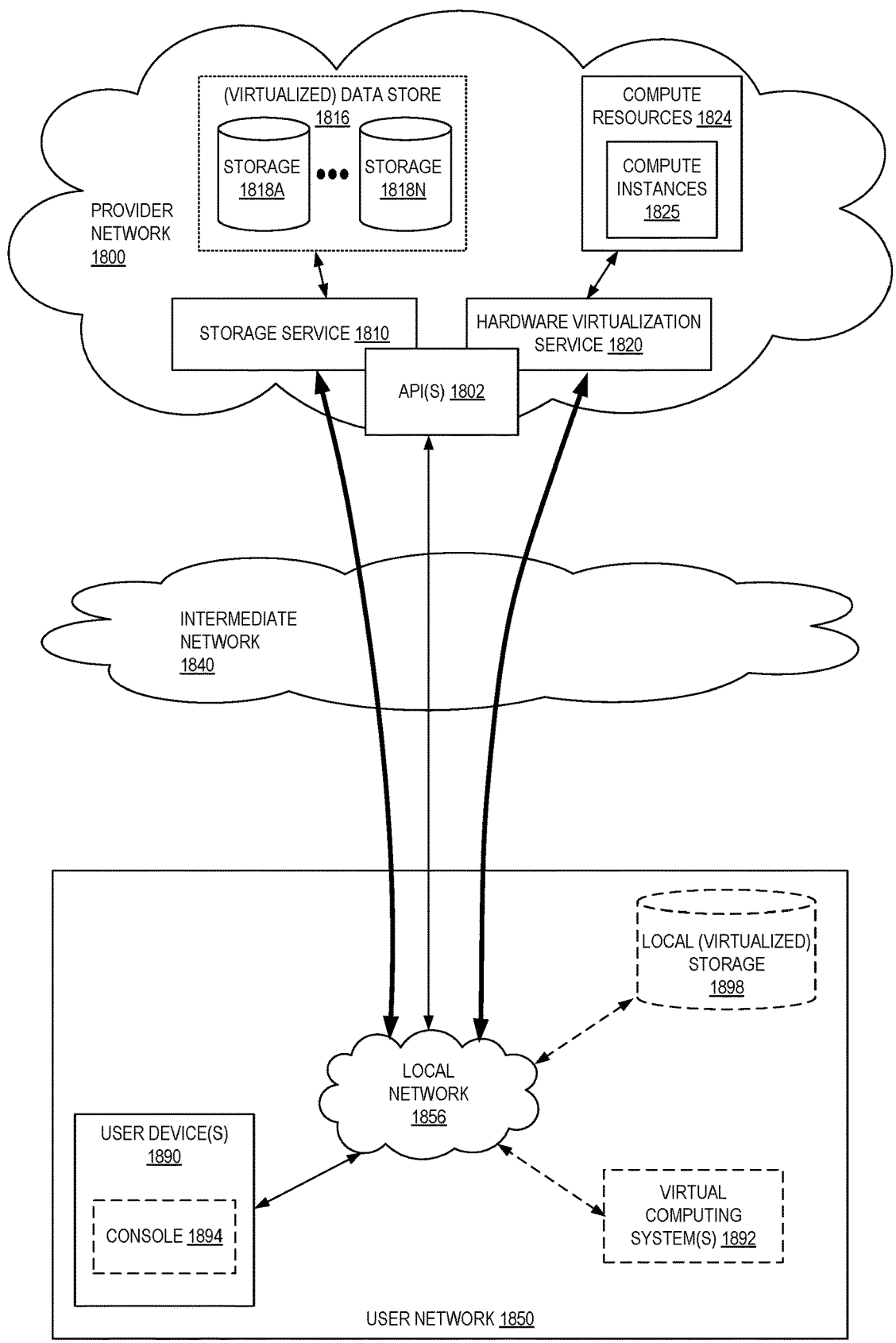
FIG. 18 is a block diagram of an example provider network that provides a storage service and a hardware virtualization service to users according to some embodiments.

FIG. 18 is a block diagram of an example provider network environment that provides a storage service and a hardware virtualization service to users, according to some embodiments. A hardware virtualization service 1820 provides multiple compute resources 1824 (e.g., compute instances 1825, such as VMs) to users. The compute resources 1824 can, for example, be provided as a service to users of a provider network 1800 (e.g., to a customer that implements a user network 1850). Each computation resource 1824 can be provided with one or more local IP addresses. The provider network 1800 can be configured to route packets from the local IP addresses of the compute resources 1824 to public Internet destinations, and from public Internet sources to the local IP addresses of the compute resources 1824.

The provider network 1800 can provide the user network 1850, for example coupled to an intermediate network 1840 via a local network 1856, the ability to implement virtual computing systems 1892 via the hardware virtualization service 1820 coupled to the intermediate network 1840 and to the provider network 1800. In some embodiments, the hardware virtualization service 1820 can provide one or more APIs 1802, for example a web services interface, via which the user network 1850 can access functionality provided by the hardware virtualization service 1820, for example via a console 1894 (e.g., a web-based application, standalone application, mobile application, etc.) of a user device 1890. In some embodiments, at the provider network 1800, each virtual computing system 1892 at the user network 1850 can correspond to a computation resource 1824 that is leased, rented, or otherwise provided to the user network 1850.

From an instance of the virtual computing system(s) 1892 and/or another user device 1890 (e.g., via console 1894), the user can access the functionality of a storage service 1810, for example via the one or more APIs 1802, to access data from and store data to storage resources 1818A-1818N of a virtual data store 1816 (e.g., a folder or "bucket," a virtualized volume, a database, etc.) provided by the provider network 1800. In some embodiments, a virtualized data store gateway (not shown) can be provided at the user network 1850 that can locally cache at least some data, for example frequently accessed or critical data, and that can communicate with the storage service 1810 via one or more communications channels to upload new or modified data from a local cache so that the primary store of data (the virtualized data store 1816) is maintained. In some embodiments, a user, via the virtual computing system 1892 and/or another user device 1890, can mount and access virtual data store 1816 volumes via the storage service 1810 acting as a storage virtualization service, and these volumes can appear to the user as local (virtualized) storage 1898.

While not shown in FIG. 18, the virtualization service(s) can also be accessed from resource instances within the provider network 1800 via the API(s) 1802. For example, a user, appliance service provider, or other entity can access a virtualization service from within a respective virtual network on the provider network 1800 via the API(s) 1802 to request allocation of one or more resource instances within the virtual network or within another virtual network.

Figure 19:
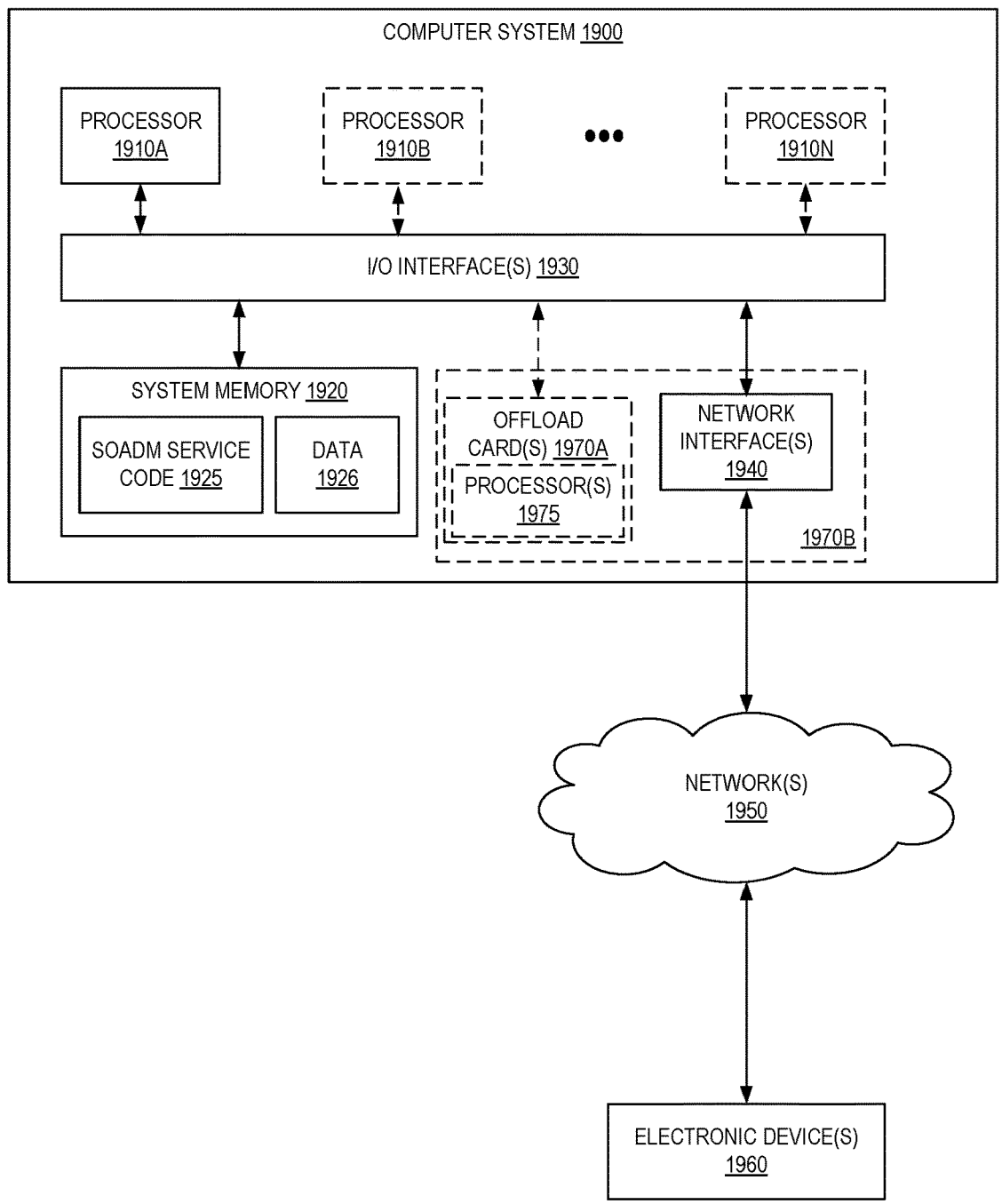
FIG. 19 is a block diagram illustrating an example computer system that can be used in some embodiments.

In some embodiments, a system that implements a portion or all of the techniques described herein can include a general-purpose computer system, such as the computer system 1900 illustrated in FIG. 19, that includes, or is configured to access, one or more computer-accessible media. In the illustrated embodiment, the computer system 1900 includes one or more processors 1910 coupled to a system memory 1920 via an input/output (I/O) interface 1930. The computer system 1900 further includes a network interface 1940 coupled to the I/O interface 1930. While FIG. 19 shows the computer system 1900 as a single computing device, in various embodiments the computer system 1900 can include one computing device or any number of computing devices configured to work together as a single computer system 1900.

In various embodiments, the computer system 1900 can be a uniprocessor system including one processor 1910, or a multiprocessor system including several processors 1910 (e.g., two, four, eight, or another suitable number). The processor(s) 1910 can be any suitable processor(s) capable of executing instructions. For example, in various embodiments, the processor(s) 1910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1910 can commonly, but not necessarily, implement the same ISA.

The system memory 1920 can store instructions and data accessible by the processor(s) 1910. In various embodiments, the system memory 1920 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1920 as SOADM service code 1925 (e.g., executable to implement, in whole or in part, the SOADM service 102) and data 1926.

In some embodiments, the I/O interface 1930 can be configured to coordinate I/O traffic between the processor 1910, the system memory 1920, and any peripheral devices in the device, including the network interface 1940 and/or other peripheral interfaces (not shown). In some embodiments, the I/O interface 1930 can perform any necessary protocol, timing, or other data transformations to convert data signals from one component (e.g., the system memory 1920) into a format suitable for use by another component (e.g., the processor 1910). In some embodiments, the I/O interface 1930 can include support for devices attached through various types of peripheral buses, such as a variant of the Peripheral Component Interconnect (PCI) bus standard or the Universal Serial Bus (USB) standard, for example. In some embodiments, the function of the I/O interface 1930 can be split into two or more separate components, such as a north bridge and a south bridge, for example. Also, in some embodiments, some or all of the functionality of the I/O interface 1930, such as an interface to the system memory 1920, can be incorporated directly into the processor 1910.

The network interface 1940 can be configured to allow data to be exchanged between the computer system 1900 and other devices 1960 attached to a network or networks 1950, such as other computer systems or devices as illustrated in FIG. 1, for example. In various embodiments, the network interface 1940 can support communication via any suitable wired or wireless general data networks, such as types of Ethernet network, for example. Additionally, the network interface 1940 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1900 includes one or more offload cards 1970A or 1970B (including one or more processors 1975, and possibly including the one or more network interfaces 1940) that are connected using the I/O interface 1930 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1900 can act as a host electronic device (e.g., operating as part of a hardware virtualization service) that hosts compute resources such as compute instances, and the one or more offload cards 1970A or 1970B execute a virtualization manager that can manage compute instances that execute on the host electronic device. As an example, in some embodiments the offload card(s) 1970A or 1970B can perform compute instance management operations, such as pausing and/or un-pausing compute instances, launching and/or terminating compute instances, performing memory transfer/copying operations, etc. These management operations can, in some embodiments, be performed by the offload card(s) 1970A or 1970B in coordination with a hypervisor (e.g., upon a request from a hypervisor) that is executed by the other processors 1910A-1910N of the computer system 1900. However, in some embodiments the virtualization manager implemented by the offload card(s) 1970A or 1970B can accommodate requests from other entities (e.g., from compute instances themselves), and can not coordinate with (or service) any separate hypervisor.

In some embodiments, the system memory 1920 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1900 via the I/O interface 1930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1900 as the system memory 1920 or another type of memory. Further, a computer-accessible medium can include transmission media or signals such as electrical, electromagnetic, or digital signals, conveyed via a communication medium such as a network and/or a wireless link, such as can be implemented via the network interface 1940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a VPN, the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C #or C++, or any scripting language, such as Perl, Python, PHP, or TCL, as well as combinations thereof. The server(s) can also include database servers, including without limitation those commercially available from Oracle(R), Microsoft(R), Sybase(R), IBM(R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1818A-1818N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
    receiving, at a cloud provider network, one or more messages collectively providing user-specified configuration data defining a service group for an application, the configuration data including:
        a first service definition corresponding to a first service of the application, wherein the first service definition is associated with a first distribution strategy indicating that instances of the first service are eligible to be deployed to a first plurality of deployment zone types of the cloud provider network, and
        a second service definition corresponding to a second service of the application, wherein the second service definition is associated with a second distribution strategy indicating that instances of the second service are eligible to be deployed to a second plurality of deployment zone types of the cloud provider network;
    causing one or more service instances of the first service and of the second service to be deployed according to the configuration data;
    receiving, from a service instance of the first service, a request identifying the second service, wherein the service instance of the first service is located in a first deployment zone, and wherein each of a plurality of deployment zones includes a service instance of the second service;
    identifying, based on latency data, a second deployment zone containing a service instance of the second service associated with a lowest network latency estimate relative to the first service, wherein the latency data includes deployment zone-to-deployment zone latency estimates for the plurality of deployment zones; and
    routing the request from the service instance of the first service to the service instance of the second service associated with the lowest network latency estimate relative to the service instance of the first service, wherein the request is routed without traversing a public internet.

2. The computer-implemented method of claim 1, wherein the service instance of the first service is part of a virtual private network deployed in the first deployment zone, and wherein the request identifies the second service using a domain name, and wherein the method further comprises:
    translating the domain name identifying the second service to an Internet Protocol (IP) address associated with an endpoint of the virtual private network, and wherein the endpoint directs the request to a router that identifies, based on the latency data indicating latency estimates between deployment zones of the plurality of deployment zones, the service instance of the second service associated with the lowest network latency estimate relative to the service instance of the first service.

3. The computer-implemented method of claim 1, wherein the request includes an identifier of a computing resource of the application, and wherein the method further comprises translating the identifier of the computing resource into a unique resource identifier provided by the cloud provider network for the computing resource, and wherein the unique resource identifier is used to route the request.

4. A computer-implemented method comprising:
    receiving, at a cloud provider network, a request from a first service of a service-oriented software application that includes a plurality of services, wherein the request identifies a second service or a computing resource of the service-oriented software application, wherein the cloud provider network includes a plurality of deployment zones, wherein the first service is deployed in a first deployment zone of the plurality of deployment zones, and wherein each of a plurality of second deployment zones includes an instance of the second service or an instance of the computing resource;
    identifying, based on latency data, a second deployment zone containing an instance of the second service or an instance of the computing resource associated with a lowest network latency estimate relative to the first service, wherein the latency data includes deployment zone-to-deployment zone latency estimates for the plurality of deployment zones; and
    routing the request from the first service to the instance of the second service or to the instance of the computing resource associated with the lowest network latency estimate relative to the first service, wherein the request is routed without traversing a public internet.

5. The computer-implemented method of claim 4, wherein the first service is part of a virtual private network deployed in the first deployment zone, and wherein the request identifies the second service using a domain name, and wherein the method further comprises:
    translating the domain name identifying the second service to an Internet Protocol (IP) address associated with an endpoint of the virtual private network, and wherein the endpoint directs the request to a router that identifies, based on the latency data indicating latency estimates between deployment zones of the plurality of deployment zones, the instance of the second service or the instance of the computing resource associated with the lowest network latency estimate relative to the first service.

6. The computer-implemented method of claim 4, wherein the request includes an identifier of the computing resource of the service-oriented software application, and wherein the method further comprises translating the identifier of the computing resource into a unique resource identifier provided by the cloud provider network for the computing resource, and wherein the unique resource identifier is used to route the request.

7. The computer-implemented method of claim 4, further comprising:
   receiving, at the cloud provider network, a request to create a service group configuration corresponding to the service-oriented software application, wherein the service group configuration is associated with at least one deployment strategy used to deploy instances of the plurality of services at particular deployment zones of the plurality of deployment zones; and
   deploying the first service to the first deployment zone and deploying the second service to the second deployment zone according to the at least one deployment strategy of the service group configuration.

8. The computer-implemented method of claim 4, wherein the first deployment zone is one of: a zone within a region of the cloud provider network, a local zone deployed in a location distinct from any region of the cloud provider network, or a wavelength zone deployed within facilities of a communications service provider.

9. The computer-implemented method of claim 4, wherein identifying the instance of the second service or the instance of the computing resource further includes searching a service registry indicating deployment locations of the second service or the computing resource.

10. The computer-implemented method of claim 4, wherein the first service is associated with a first account of the cloud provider network and the second service is associated with a second account of the cloud provider network.

11. The computer-implemented method of claim 4, wherein the first service implements a frontend of the service-oriented software application and is configured to receive requests from application clients, and wherein the second service implements a backend dependency of the first service.

12. The computer-implemented method of claim 4, further comprising:
   obtaining updated network latency estimates between the plurality of deployment zones; and
   modifying the latency data indicating the network latency estimates to reflect the updated network latency estimates.

13. The computer-implemented method of claim 4, further comprising receiving input indicating that the second service is a private service, and wherein the second service is not associated with a public Internet Protocol (IP) address.

14. The computer-implemented method of claim 4, wherein the computing resource is one of: a data object stored by a data storage service, a block storage volume managed by a block-storage service, or a virtual machine image managed by a hardware virtualization service.

15. A system comprising:
   a first one or more electronic devices to host computing resources at an edge location associated with a cloud provider network;
   a second one or more electronic devices to host computing resources within a region of the cloud provider network; and
   a third one or more electronic devices to implement a deployment management service in the cloud provider network, the deployment management service including instructions that upon execution cause the deployment management service to:
      receive a request from a first service of a service-oriented software application that includes a plurality of services, wherein the request identifies a second service or a computing resource of the service-oriented software application, wherein the cloud provider network includes a plurality of deployment zones, wherein the first service is deployed in a first deployment zone of the plurality of deployment zones, and wherein each of a plurality of second deployment zones includes an instance of the second service or an instance of the computing resource;
      identify, based on latency data, a second deployment zone containing an instance of the second service or an instance of the computing resource associated with a lowest network latency estimate relative to the first service, wherein the latency data includes deployment zone-to-deployment zone latency estimates for the plurality of deployment zones; and
      route the request from the first service to the instance of the second service or to the instance of the computing resource associated with the lowest network latency estimate relative to the first service, wherein the request is routed without traversing a public internet.

16. The system of claim 15, wherein the first service is part of a virtual private network deployed in the first deployment zone, and wherein the request identifies the second service using a domain name, and wherein the instructions upon execution further cause the deployment management service to:
   translate the domain name identifying the second service to an Internet Protocol (IP) address associated with an endpoint of the virtual private network, and wherein the endpoint directs the request to a router that identifies, based on the latency data indicating latency estimates between deployment zones of the plurality of deployment zones, the instance of the second service or the instance of the computing resource associated with the lowest network latency estimate relative to the first service.

17. The system of claim 15, wherein the request identifies the computing resource of the service-oriented software application, and wherein the instructions upon execution further cause the deployment management service to identify a unique resource identifier provided by the cloud provider network for the computing resource, and wherein the unique resource identifier is used to route the request.

18. The system of claim 15, wherein the instructions upon execution further cause the deployment management service to:
   receiving, at the cloud provider network, a request to create a service group configuration corresponding to the service-oriented software application, wherein the service group configuration is associated with at least one deployment strategy used to deploy instances of the plurality of services at particular deployment zones of the plurality of deployment zones; and deploying the first service to the first deployment zone and deploying the second service to the second deployment zone according to the at least one deployment strategy of the service group configuration.

19. The system of claim 15, wherein the first deployment zone is one of: a zone within a region of the cloud provider network, a local zone deployed in a location distinct from any region of the cloud provider network, or a wavelength zone deployed within facilities of a communications service provider.

20. The system of claim 15, wherein identifying the instance of the second service or the instance of the computing resource further includes searching a service registry indicating deployment locations of the second service or the computing resource.

* * * * *